(12) United States Patent
Takamatsu

(10) Patent No.: US 9,482,860 B2
(45) Date of Patent: Nov. 1, 2016

(54) OPTICAL UNIT, LIGHT SOURCE APPARATUS, AND IMAGE DISPLAY APPARATUS

(71) Applicant: Sony Corporation, Tokyo (JP)

(72) Inventor: Takashi Takamatsu, Tokyo (JP)

(73) Assignee: Sony Corporation, Tokyo (JP)

( * ) Notice: Subject to any disclaimer, the term of this patent is extended or adjusted under 35 U.S.C. 154(b) by 224 days.

(21) Appl. No.: 14/289,367

(22) Filed: May 28, 2014

(65) Prior Publication Data

US 2014/0362350 A1 Dec. 11, 2014

(30) Foreign Application Priority Data

Jun. 7, 2013 (JP) ................................. 2013-120683

(51) Int. Cl.
| | |
|---|---|
| G03B 21/20 | (2006.01) |
| G02B 26/00 | (2006.01) |
| G02B 7/00 | (2006.01) |
| G02B 19/00 | (2006.01) |
| G02B 7/182 | (2006.01) |
| H04N 9/31 | (2006.01) |

(52) U.S. Cl.
CPC ............ *G02B 26/008* (2013.01); *G02B 7/006* (2013.01); *G02B 7/1825* (2013.01); *G02B 19/0023* (2013.01); *G02B 19/0057* (2013.01); *G03B 21/204* (2013.01); *H04N 9/3161* (2013.01)

(58) Field of Classification Search
CPC ........ G02B 19/00; G02B 7/18; G02B 26/00; G03B 21/204; H01L 33/50; H04N 9/00
See application file for complete search history.

(56) References Cited

U.S. PATENT DOCUMENTS

2012/0133903 A1* 5/2012 Tanaka ............... G03B 21/2013 353/31

\* cited by examiner

*Primary Examiner* — Sultan Chowdhury
*Assistant Examiner* — Danell L Owens
(74) *Attorney, Agent, or Firm* — Wolf, Greenfield & Sacks, P.C.

(57) ABSTRACT

Provided is an optical unit including: a wheel portion including a wheel in which a light emitter that is excited by light of a predetermined wavelength range and emits visible light having a longer wavelength range than the light of the predetermined wavelength range is provided and a motor that drives the wheel, the wheel portion being configured to emit synthetic light including the light of the predetermined wavelength range and the visible light from the light emitter; a lens portion including at least one lens that collects the synthetic light emitted from the wheel portion and a light emitting surface that emits the collected synthetic light; and a holder portion configured to support the wheel portion and the lens portion as one unit.

12 Claims, 17 Drawing Sheets

OPTICAL UNIT, LIGHT SOURCE APPARATUS, AND IMAGE DISPLAY APPARATUS

CROSS REFERENCE TO RELATED APPLICATIONS

This application claims the benefit of Japanese Priority Patent Application JP 2013-120683 filed Jun. 7, 2013, the entire contents of which are incorporated herein by reference.

BACKGROUND

The present disclosure relates to an optical unit, a light source apparatus that uses the optical unit, and an image display apparatus.

Recently, products adopting a solid light source such as an LED (Light Emitting Diode) and an LD (Laser Diode) as a light source used for a presentation projector or a digital cinema projector instead of a mercury lamp, a xenon lamp, or the like of the related art are becoming widespread. The solid light source such as an LED has advantages that its lifetime is long, a lamp exchange as in the related art is unnecessary, and it immediately lights up as the power is turned on.

For example, Japanese Patent Application Laid-open No. 2013-41064 (hereinafter, referred to as Patent Document 1) discloses a projection type video display device equipped with a light source apparatus including a solid light source and a projection unit. As shown in FIG. 6 and the like of Patent Document 1, the light source apparatus includes a solid light source 10, a rod integrator 20, a color wheel 30, and a lens holding member 200. As excitation light, blue component light from the solid light source is irradiated onto a light emitter 33 formed in the color wheel 30. Red component light and green component light are generated from the light emitter 33 onto which excitation light is irradiated, and red component light, green component light, and blue component light are emitted time-divisionally. A recess 210 through which the light emitter 33 passes as the color wheel 30 rotates is formed in the lens holding member 200. With this structure, a lens 93 can be provided near the light emitter 33 (paragraph (0058) etc. of Patent Document 1).

SUMMARY

When collecting light generated from the light emitter by the irradiation of excitation light using a collecting lens and irradiating it as described above, positioning of the wheel in which the light emitter is formed and the collecting lens becomes important. A technique that enables such positioning to be performed simply and accurately is being demanded.

In view of the circumstances as described above, there is a need for an optical unit capable of realizing simple and highly-accurate positioning of a lens for collecting light and a wheel including a light emitter, a light source apparatus that uses the optical unit, and an image display apparatus.

According to an embodiment of the present disclosure, there is provided an optical unit including a wheel portion, a lens portion, and a holder portion.

The wheel portion includes a wheel in which a light emitter that is excited by light of a predetermined wavelength range and emits visible light having a longer wavelength range than the light of the predetermined wavelength range is provided and a motor that drives the wheel, the wheel portion being configured to emit synthetic light including the light of the predetermined wavelength range and the visible light from the light emitter.

The lens portion includes at least one lens that collects the synthetic light emitted from the wheel portion and a light emitting surface that emits the collected synthetic light.

The holder portion is configured to support the wheel portion and the lens portion as one unit.

In the optical unit, the wheel portion including the wheel in which the light emitter is provided and the motor and the lens portion including the at least one lens and the light emitting surface are supported as one unit. With this structure, the positioning of those portions can be realized simply and highly accurately.

The holder portion may include a lens holding portion that holds the at least one lens with the light emitting surface as a front side and a wheel holding portion that is coupled with the lens holding portion on a rear side of the lens holding portion and holds the wheel portion.

As described above, the lens portion may be held on the rear side of the lens holding portion holding the at least one lens. With this structure, it becomes possible to realize the unit with a simple structure and miniaturize the unit.

The lens portion may emit the synthetic light along a predetermined optical axis direction. In this case, the wheel holding portion may hold the wheel portion such that a rotation axis of the motor extends in the same direction as the predetermined optical axis direction.

Since the optical axis direction of the lens portion and the rotation axis direction of the motor can be made to coincide, it is possible to realize the unit with a simple structure and miniaturize the unit.

The rotation axis of the motor may be provided at a center of the wheel. In this case, the wheel holding portion may hold the wheel portion such that the rotation axis of the motor is positioned below a center line passing a center of the at least one lens in a vertical direction.

As described above, the wheel portion may be held such that the rotation axis of the motor provided at the center of the wheel is positioned below the center line of the at least one lens in the vertical direction. With this structure, it becomes possible to realize the unit with a simple structure and miniaturize the unit.

The wheel holding portion may include an arm portion formed on the rear side of the lens holding portion while sandwiching the wheel with the lens holding portion and a motor holding portion that is formed at a tip end of the arm portion and holds the motor.

By the lens holding portion and the arm portion, the wheel is sandwiched from both sides. Therefore, highly-accurate positioning becomes possible, and the synthetic light from the wheel portion can be efficiently guided to the at least one lens.

According to an embodiment of the present disclosure, there is provided a light source apparatus including a light source portion, the optical unit, and a base portion.

The light source portion includes at least one solid light source capable of emitting light of a predetermined wavelength range as emission light.

The base portion is configured to support the light source portion and the optical unit.

According to an embodiment of the present disclosure, there is provided an image display apparatus including the light source portion, the optical unit, the base portion, an image generating system, and a projecting system.

The image generating system includes an image generating device that generates an image based on irradiated light and an illumination optical system that irradiates the synthetic light from the optical unit onto the image generating device.

The projecting system is configured to project the image generated by the image generating device.

As described above, according to the embodiments of the present disclosure, it becomes possible to realize the positioning of the lens for collecting light and the wheel including the light emitter simply and highly accurately.

These and other objects, features and advantages of the present disclosure will become more apparent in light of the following detailed description of best mode embodiments thereof, as illustrated in the accompanying drawings.

DETAILED DESCRIPTION OF EMBODIMENTS

Hereinafter, an embodiment of the present disclosure will be described with reference to the drawings.

(Light Source Apparatus)

Figure 1:
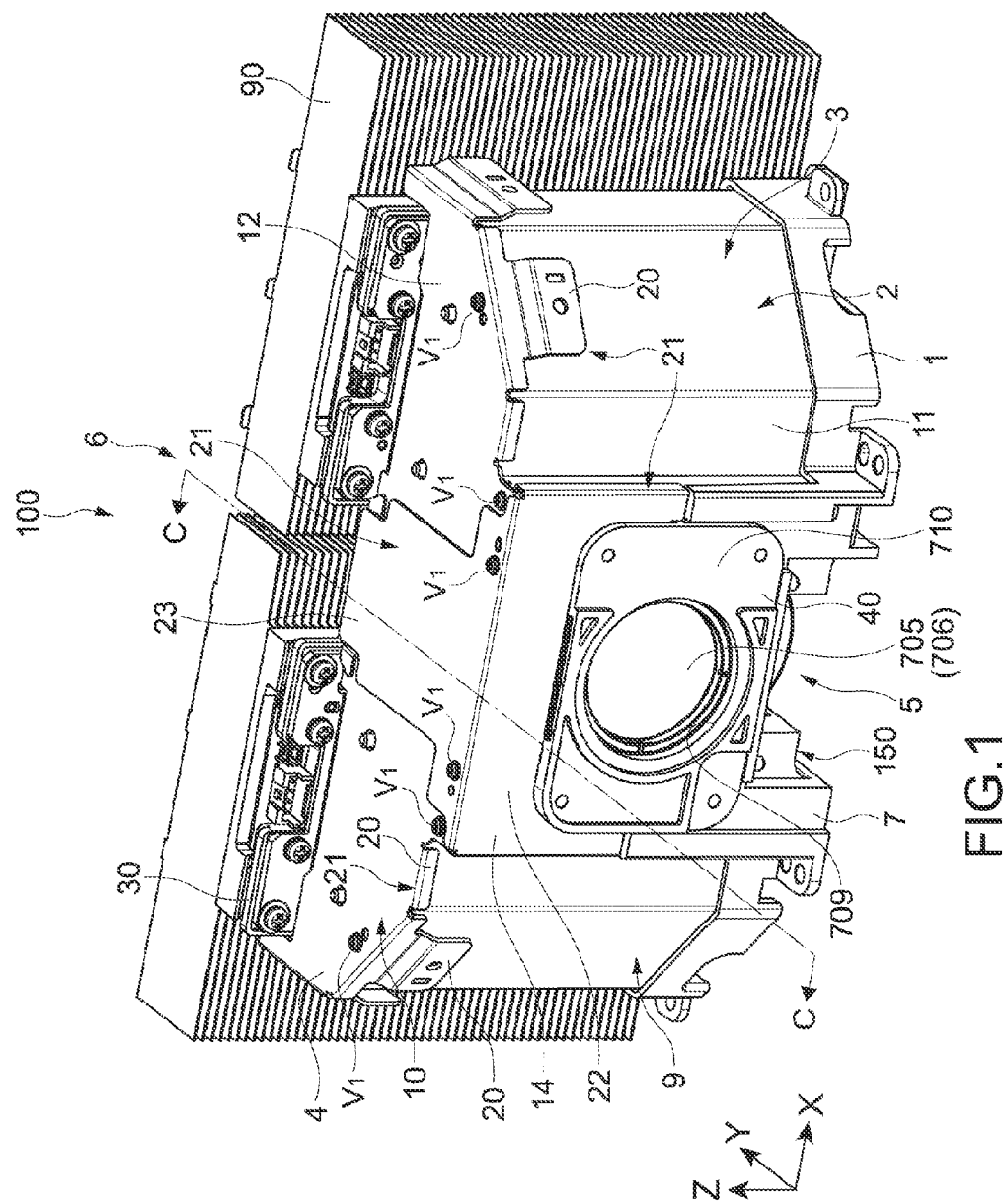
FIG. 1 is a perspective view showing a structural example of a light source apparatus according to an embodiment of the present disclosure.
Figure 2:
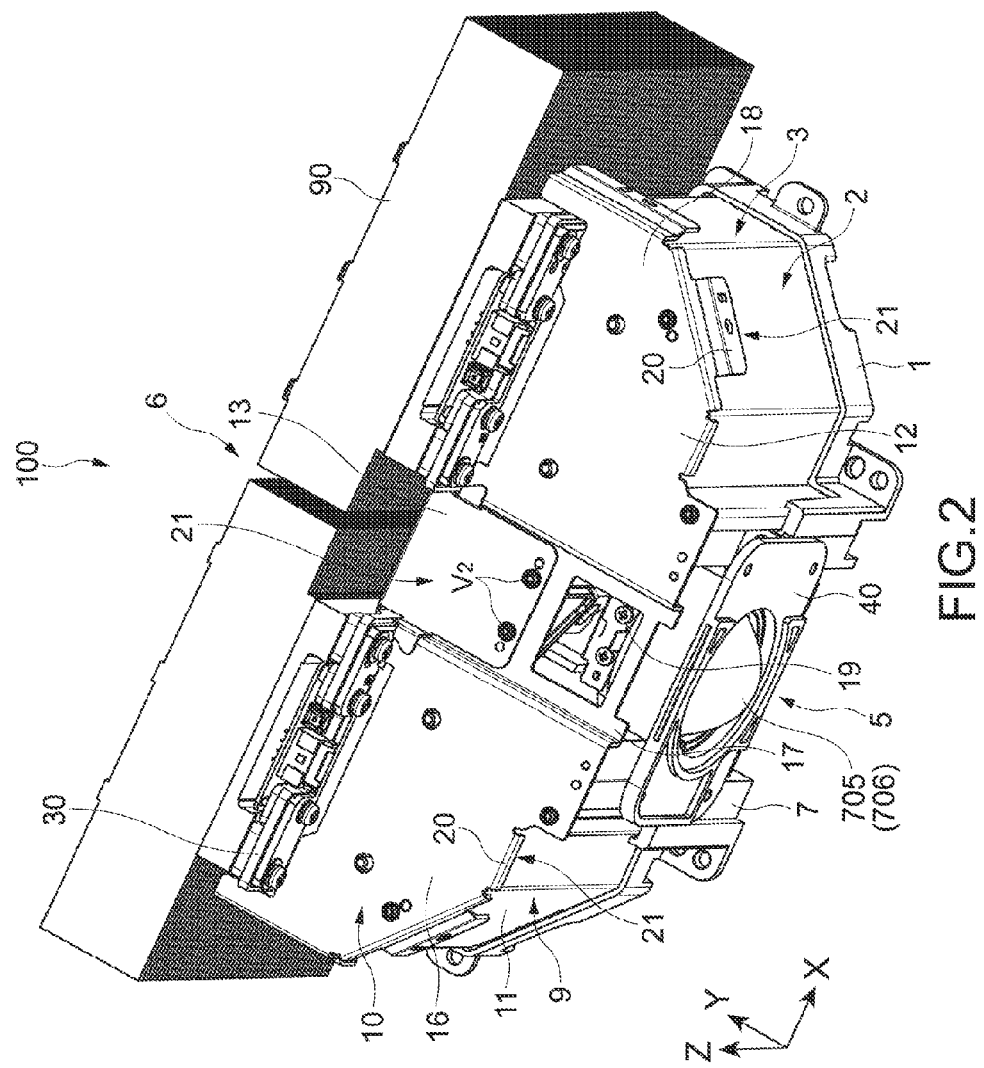
FIG. 2 is a diagram showing a state where a front member of the light source apparatus shown in FIG. 1 is removed.
Figure 3:
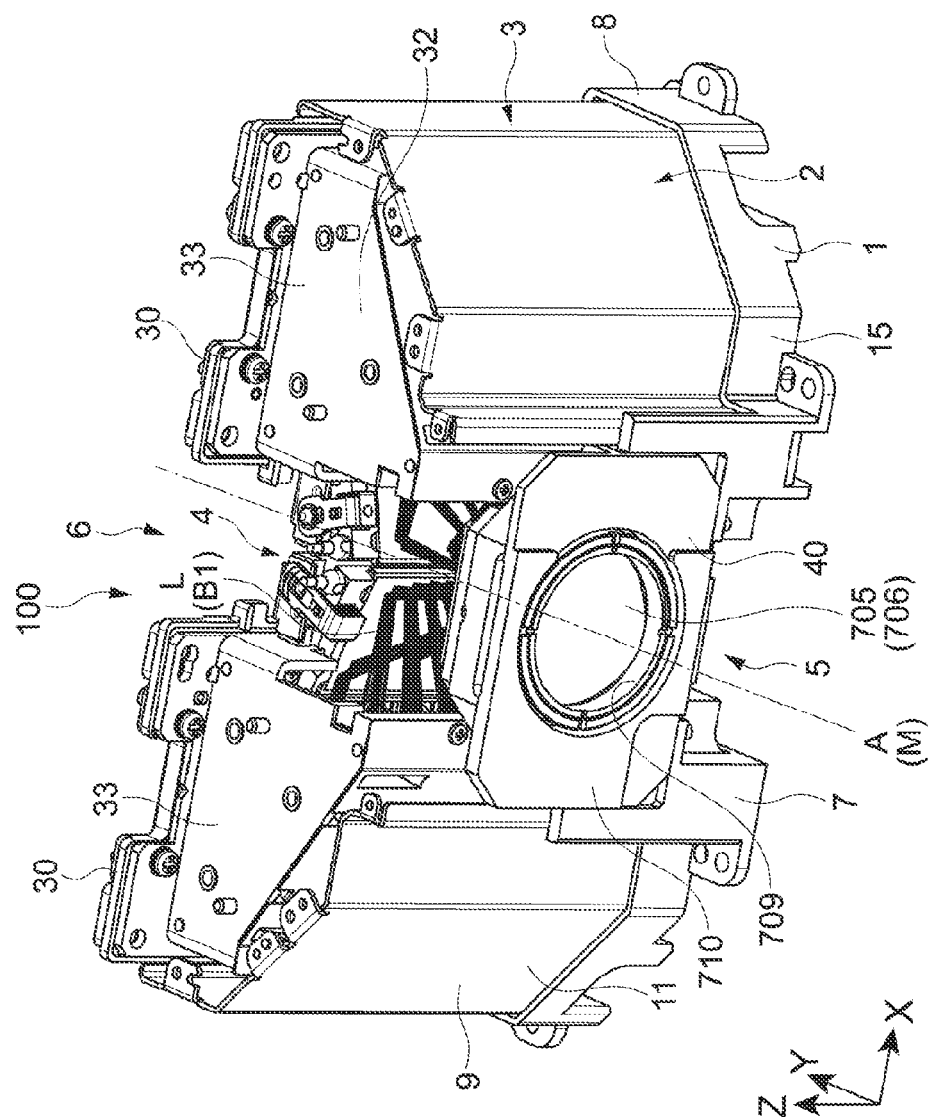
FIG. 3 is a diagram showing a state where a rear member and lid member of the light source apparatus shown in FIG. 2 are removed.

FIG. 1 is a perspective view showing a structural example of a light source apparatus 100 according to an embodiment of the present disclosure. FIG. 2 is a diagram showing a state where a front member 14 of the light source apparatus 100 shown in FIG. 1 is removed. FIG. 3 is a diagram showing a state where a rear member 13 and lid member 12 of the light source apparatus 100 shown in FIG. 2 are removed. In FIG. 3, an illustration of a heat sink 90 shown in FIGS. 1 and 2 is omitted.

The light source apparatus 100 is a light source apparatus for a projector, that is of a type that emits white light obtained by synthesizing laser light having a blue wavelength range and light from a red wavelength range to a green wavelength range that is generated from a fluorescent substance excited by the laser light. The white light corresponds to the synthetic light in this embodiment.

As shown in FIG. 1, the light source apparatus 100 includes a base portion 1 provided at a bottom portion and an outer frame portion 2 supported by the base portion 1. A casing portion 3 of this embodiment is constituted of the base portion 1 and the outer frame portion 2. The casing portion 3 holds a light source portion 30 including at least one solid light source and a fluorescent body unit 40 that generates and emits white light upon receiving light from the light source portion 30. As shown in FIG. 3, emission light L from the light source portion 30 is irradiated onto the fluorescent body unit 40 at a spatial portion 4 inside the casing portion 3.

The base portion 1 is flat and elongated in one direction. The longitudinal direction of the base portion 1 in which it is elongated corresponds to a lateral direction of the light source apparatus 100, and a short-side direction orthogonal to the longitudinal direction corresponds to a front-back direction. Therefore, one of the two longitudinal portions opposing each other in the short-side direction corresponds to a front side 5, and the other corresponds to a rear side 6. A portion of the base portion 1 on the front side 5 corresponds to a first edge portion 7, and a portion thereof on the rear side 6 corresponds to a second edge portion 8. The first edge portion 7 and the second edge portion 8 oppose each other in the front-back direction.

A direction orthogonal to both the longitudinal direction and the short-side direction corresponds to a height direction of the light source apparatus 100. In the example shown in FIG. 1, the x-, y-, and z-axis directions respectively correspond to the lateral direction, the front-back direction, and the height direction. Further, the xy plane direction corresponds to a plane direction of the base portion 1.

The outer frame portion 2 includes a side wall portion 9 extending in the height direction vertical to the plane direction of the base portion 1 and a lid portion 10 covering the side wall portion 9. In this embodiment, the casing portion 3 constituted of the side wall portion 9 and the lid portion 10 is structured by two side wall members 11, a lid member 12, a rear member 13, and a front member 14. As shown in FIG. 3, the two side wall members 11 are attached to the base portion 1. The side wall members 11 are attached so as to be fit inside a wall portion 15 formed at a circumferential edge portion of the base portion 1.

At an upper portion of the two side wall members 11, the lid member 12 is attached. As shown in FIG. 2, the lid member 12 includes a right cover portion 16, a center portion 17, and a left cover portion 18. The right cover portion 16 and the left cover portion 18 are portions that respectively cover the two side wall members 11 and are laterally symmetrical. This shape is practically the same as the shape of the circumferential edge portion of the base portion 1. The center portion 17 is a portion that couples the right cover portion 16 and the left cover portion 18. The center portion 17 is concave and includes an opening 19 on the front side. The opening 19 is positioned practically above the fluorescent body unit 40 held by the first edge portion 7 of the base portion 1.

At a circumferential edge portion of the right cover portion 16 and left cover portion 18, bending portions 20 extending downwardly along the height direction are formed.

The bending portions 20 are formed across almost the entire circumferential edge portion of the right cover portion 16 and left cover portion 18. The lid member 12 is attached such that the bending portions 20 overlap on an outer side of the side wall members 11. Therefore, the two side wall members 11 and the lid member 12 are arranged so as to form overlap portions 21 where the two adjacent members overlap. The overlap portions 21 are each a portion where a part of one of the members overlap a part of the other adjacent member. Here, the overlap portions 21 are formed by the upper portion of the side wall members 11 and the bending portions 20 of the lid member 12.

As shown in FIG. 2, the rear member 13 is attached so as to form the overlap portion 21 on the rear side of the center portion 17 of the lid member 12. The rear member 13 is arranged so as to cover a gap between the two light source portions 30 provided at the second edge portion 8 of the base portion 1. The rear member 13 is arranged so as to overlap the portion of the opening 19 on the rear side, that is formed at the center portion 17 of the lid member 12.

As shown in FIG. 1, the front member 14 is attached last. The front member 14 includes a front surface portion 22 and an upper surface portion 23 and is attached above the base portion 1 on the first edge portion 7 side. The front member 14 is arranged such that the front surface portion 22 covers the fluorescent body unit 40 provided at the first edge portion 7 from the upward direction. At this time, the upper surface portion 23 of the front member 14 is arranged so as to cover the entire center portion 17 of the lid member 12. Therefore, the portion of the rear member 13 overlapping the center portion 17 is covered by the upper surface portion 23 of the front member 14. The overlap portions 21 are formed by the two side wall members 11 and the front surface portion 22. Moreover, the overlap portion 21 is formed by the center portion 17 and the rear member 13.

As described above, in this embodiment, the outer frame portion 2 is constituted of a plurality of frame members including the two side wall members 11, the lid member 12, the rear member 13, and the front member 14. The plurality of frame members are assembled such that the overlap portions 21 are formed at adjacent portions. As a result, it becomes possible to sufficiently prevent emission light or reflected light traveling from the light source portion 30 to the fluorescent body unit 40 from leaking outside the outer frame portion 2. In other words, a light shield effect of the outer frame portion 2 can be improved. Moreover, as compared to the case of integrally forming the outer frame portion 2, it becomes possible to prepare the frame members by processing inexpensive sheet metal, for example, and thus it becomes possible to inexpensively and simply assemble the outer frame portion 2.

The shape, size, and the like of the overlap portions 21 are not limited, and it is only necessary for at least the adjacent members to overlap. Although the light shield effect is maintained high when the overlap portions 21 are formed across the entire adjacent portions, there may be portions that partially do not overlap due to a design restriction and the like. Further, it is also possible to improve the light shield effect by enlarging the overlap portion 21 at a portion where light highly likely leaks due to the positions of the light source portion 30 and the fluorescent body unit 40 inside the casing portion 3 or a position of an optical path of the emission light.

For example, adjacent members may be arranged so as to overlap each other while the members are not brought into contact with each other and a gap is formed therebetween. Also in this case, it is possible to suppress the leakage of light if the size of the overlapping area is sufficient. It is also possible to use the space between the members as a flow path for cooling air to be described later. The overlap portion 21 is also formed by such members arranged so as to overlap each other while not being in contact with each other.

Further, by structuring the outer frame portion 2 using a plurality of frame members, the cooling structure to be described later can be realized with ease.

The plurality of frame members are attached sequentially with the base portion 1 as a base and assembled so as not to be dismantled in a state where the lid member 12 and the front member 14 constituting the lid portion 10 are fixed. Therefore, a member provided in the middle, such as the side wall members 11, cannot be removed in the state where the lid member 12 and the front member 14 are fixed. Accordingly, the casing portion 3 that cannot be disassembled easily can be realized, and a light source apparatus 100 that is capable of preventing laser light from being irradiated onto a human body and the like and has high safety can be realized. Moreover, a structure that uses a fastening member such as a screw or other fixing members only for fixing the front member 14 and the lid member 12 and not for fixing other members can be realized. As a result, the number of necessary fixing members can be reduced, and component costs can be suppressed.

A special screw is used as a fixing member V1 for fixing the front member 14 and the lid member 12 shown in FIG. 1. The special screw refers to a fixing member that can be released by a dedicated releasing member. For example, a fixing member in which a hole having a special shape is formed at a head portion of a screw is used. Examples of the special shape includes a polygon with many corners, such as an octagon and a heptagon, and a star shape whose tip end is sharp but a base portion is round. For such a fixing member, a dedicated releasing member corresponding to the hole shape becomes necessary. The hole shape is not limited, and the shape of the hole at the head portion does not need to be special. A fixing member including a special structure that is not released by a generally-used releasing member such as a driver and a wrench only needs to be used.

As shown in FIG. 2, the rear member 13 is fixed to the center portion 17 of the lid member 12 by fixing members V2. A special screw may be used for the fixing members V2. On the other hand, since this portion is a portion that cannot be directly accessed because it is covered by the front member 14, a generally-used fixing member such as a screw may be used herein. In other words, the special fixing member such as a special screw only needs to be used as a fixing member that is attached to a position that is at least directly accessible and at which the casing portion 3 can be opened and closed. With this structure, it becomes possible to sufficiently prevent the casing portion 3 from being disassembled easily.

As shown in FIG. 3, the two light source portions 30 are arranged longitudinally at the second edge portion 8 of the base portion 1. The light source portion 30 includes a plurality of laser light sources 31 capable of emitting blue laser light B1 as at least one solid light source (see FIG. 4). The plurality of laser light sources 31 are arranged at the second edge portion 8 such that the blue laser light B1 is emitted toward the first edge portion 7 side along the front-back direction as an optical axis direction.

In front of each of the two light source portions 30, a light collecting optical system is provided. The light collecting optical system collects the blue laser light B1 from the plurality of laser light sources 31 at a predetermined point of the fluorescent body unit 40. In FIG. 3, a supporting portion 32 is illustrated in front of the light source portion 30. The supporting portion 32 is a member that supports the light source portion 30 and the light collecting optical system as one unit. By the supporting portion 32, a light collecting unit 33 including the light source portion 30 and the light collecting optical system is structured.

Using the blue laser light B1 collected by the light collecting unit 33 as excitation light, white light from the fluorescent body unit 40 is emitted along an optical axis A. A direction of the optical axis A of white light is set in the same direction as the optical axis direction of the blue laser light B1 from the plurality of laser light sources 31. In other words, the fluorescent body unit 40 is provided at the first edge portion 7 such that white light is emitted in the same direction as the optical axis direction of the blue laser light B1.

Figure 4:
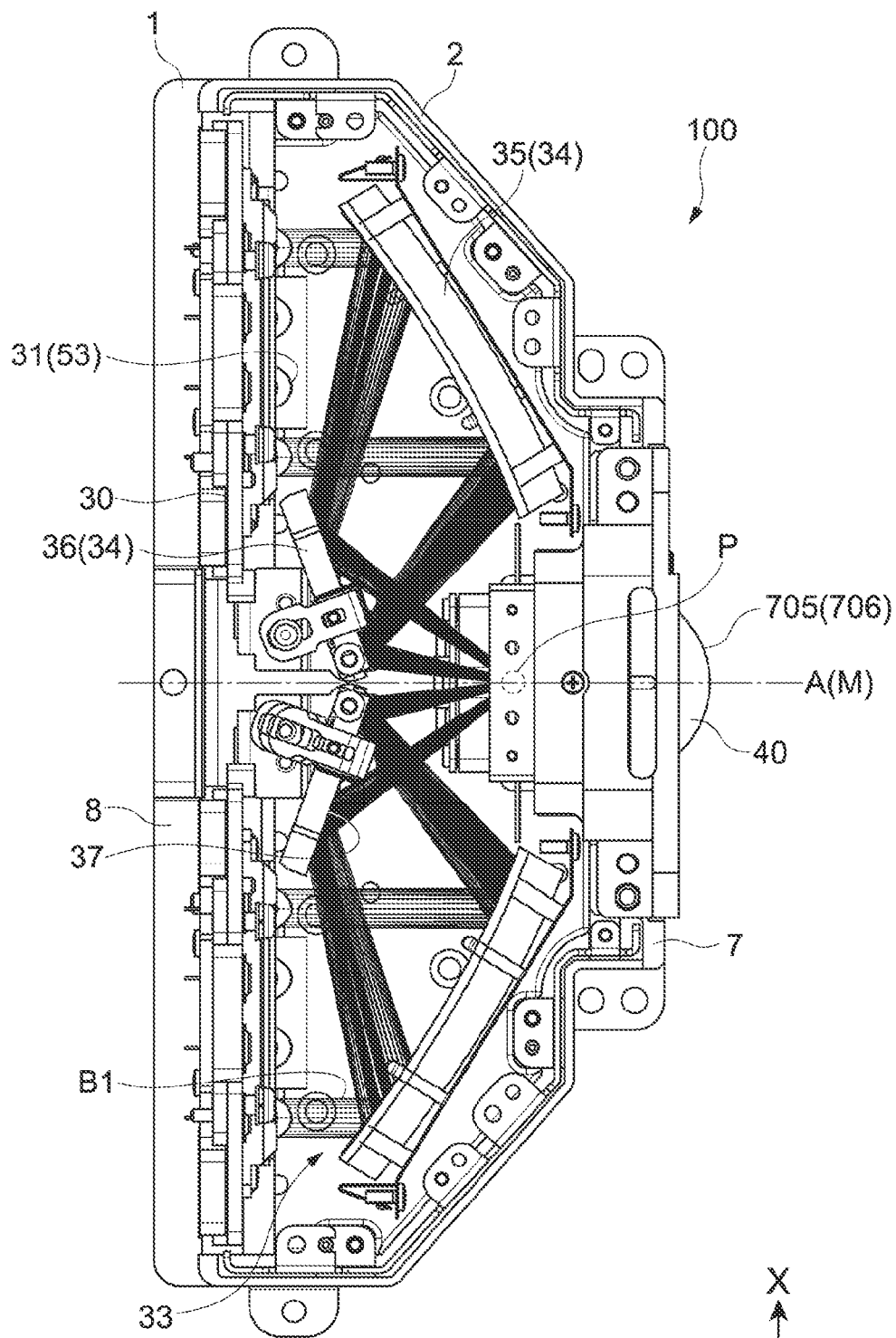
FIG. 4 is a plan view of the light source apparatus shown in FIG. 3 seen from an upper side.
Figure 5:
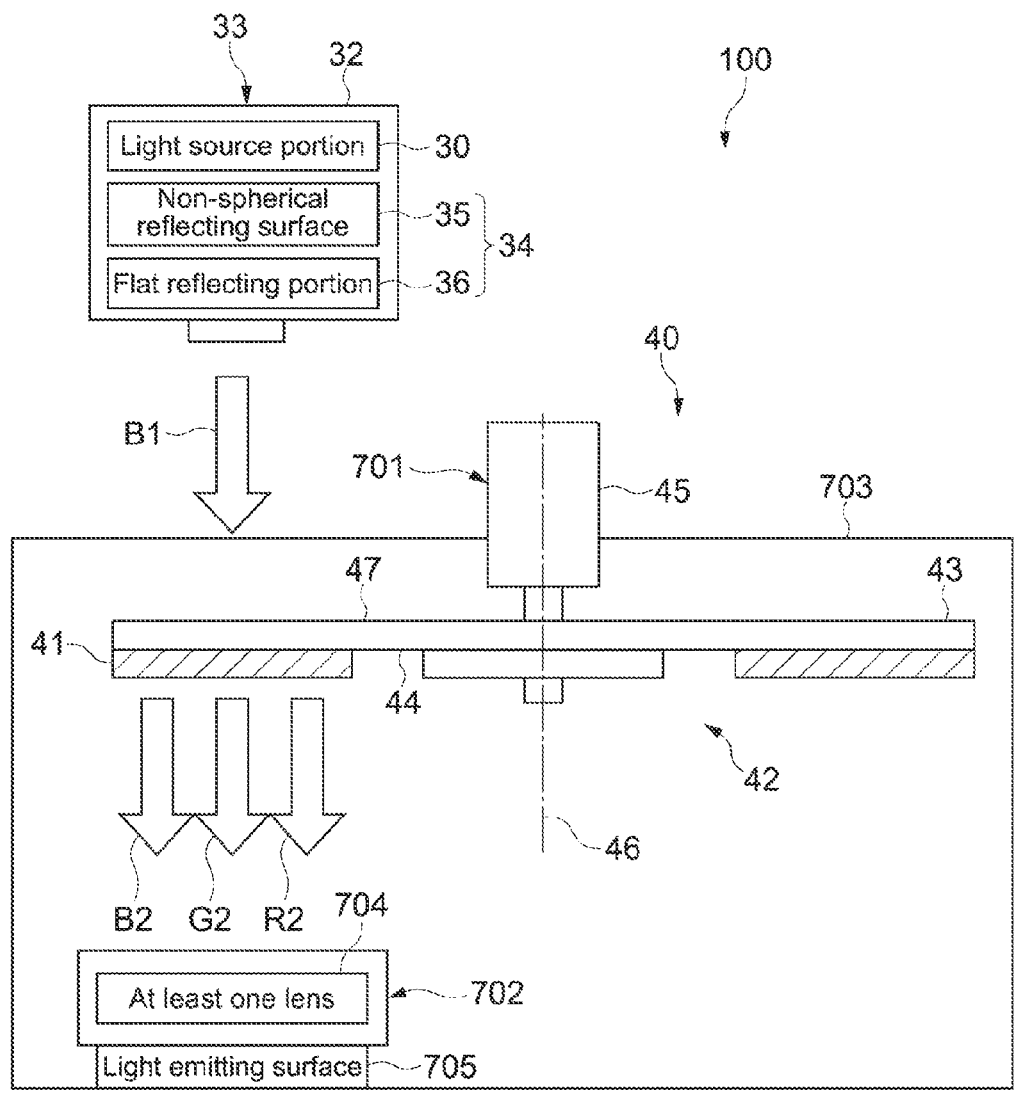
FIG. 5 is a schematic structural diagram for explaining emission of light by the light source apparatus.

FIG. 4 is a plan view of the light source apparatus 100 shown in FIG. 3 seen from an upper side. In FIG. 4, an illustration of the supporting portion 32 is omitted. FIG. 5 is a schematic structural diagram for explaining emission of light by the light source apparatus 100.

The light collecting unit 33 includes the light source portion 30 including the plurality of laser light sources 31, a light collecting optical system 34 that collects the blue laser light B1 as emission light from the plurality of laser light sources 31 at a predetermined point P, and the supporting portion 32 that supports the light source portion 30 and the light collecting optical system 34 as one unit.

The plurality of laser light sources 31 is a blue laser light source capable of oscillating the blue laser light B1 having an emission intensity peak wavelength within a wavelength range of 400 nm to 500 nm, for example. The plurality of laser light sources 31 correspond to at least one solid light source capable of emitting light of a predetermined wavelength range as emission light. Other light sources such as an LED may be used as the solid light source. Further, light having the predetermined wavelength range is not limited to the blue laser light B1.

The light collecting optical system 34 collects the blue laser light B1 emitted from the plurality of laser light sources 31 on a fluorescent body 41 from the rear side of the fluorescent body unit 40. The light collecting optical system 34 of this embodiment includes a non-spherical reflecting surface 35 and a flat reflecting portion 36. The non-spherical reflecting surface 35 reflects and collects the emission light from the plurality of laser light sources 31.

The flat reflecting portion 36 reflects light from the plurality of laser light sources 31 reflected by the non-spherical reflecting surface 35 toward the fluorescent body 41. The flat reflecting portion 36 includes a flat reflecting surface 37 as a reflecting surface for reflecting light from the plurality of laser light sources 31 and reflects light toward the fluorescent body 41 using the flat reflecting surface 37. Accordingly, the blue laser light B from the plurality of laser light sources 31 is collected at the predetermined point P on the fluorescent body 41 of the fluorescent body unit 40.

The supporting portion 32 described above supports the light source portion 30, the non-spherical reflecting surface 35, and the flat reflecting portion 36 as one unit.

(Fluorescent Body Unit)

Figure 6:
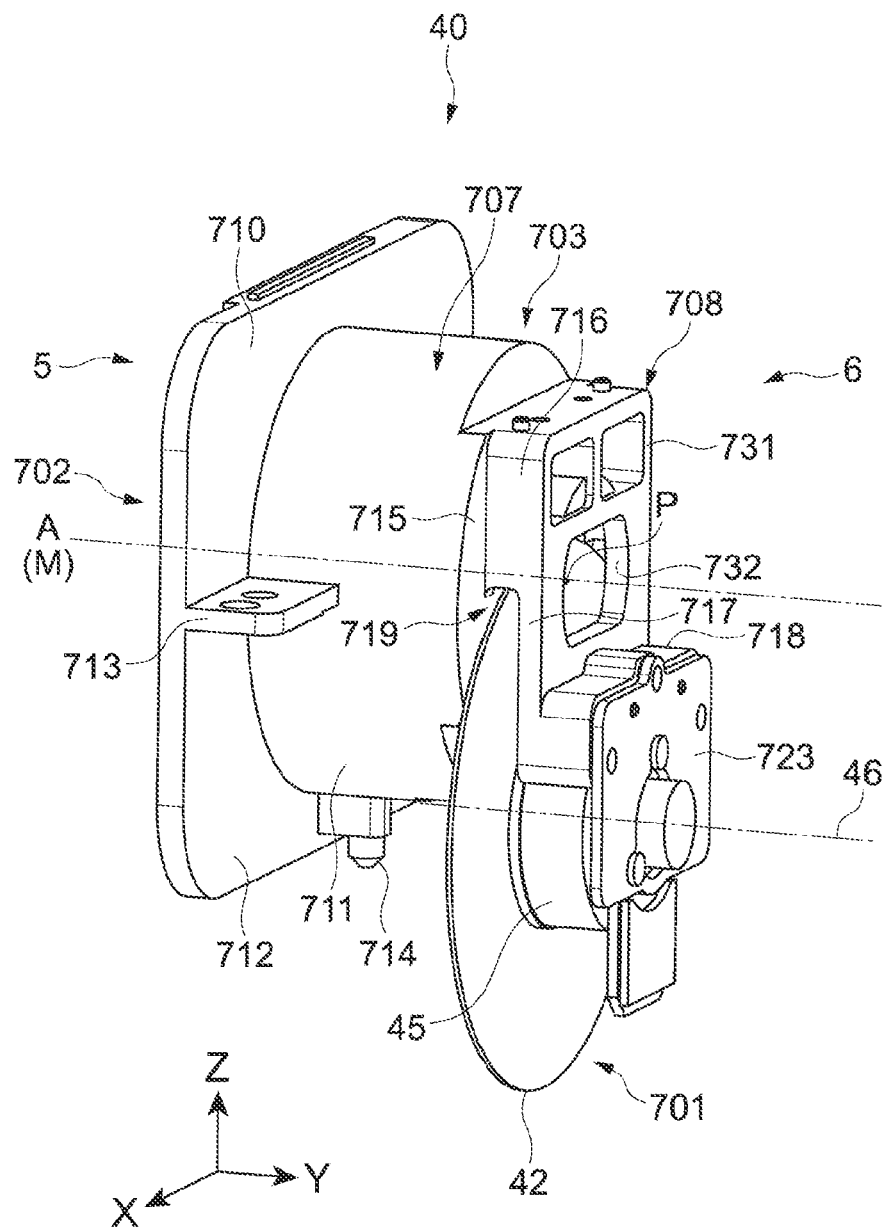
FIG. 6 is a perspective view showing a structural example of a fluorescent body unit according to the embodiment.
Figure 7:
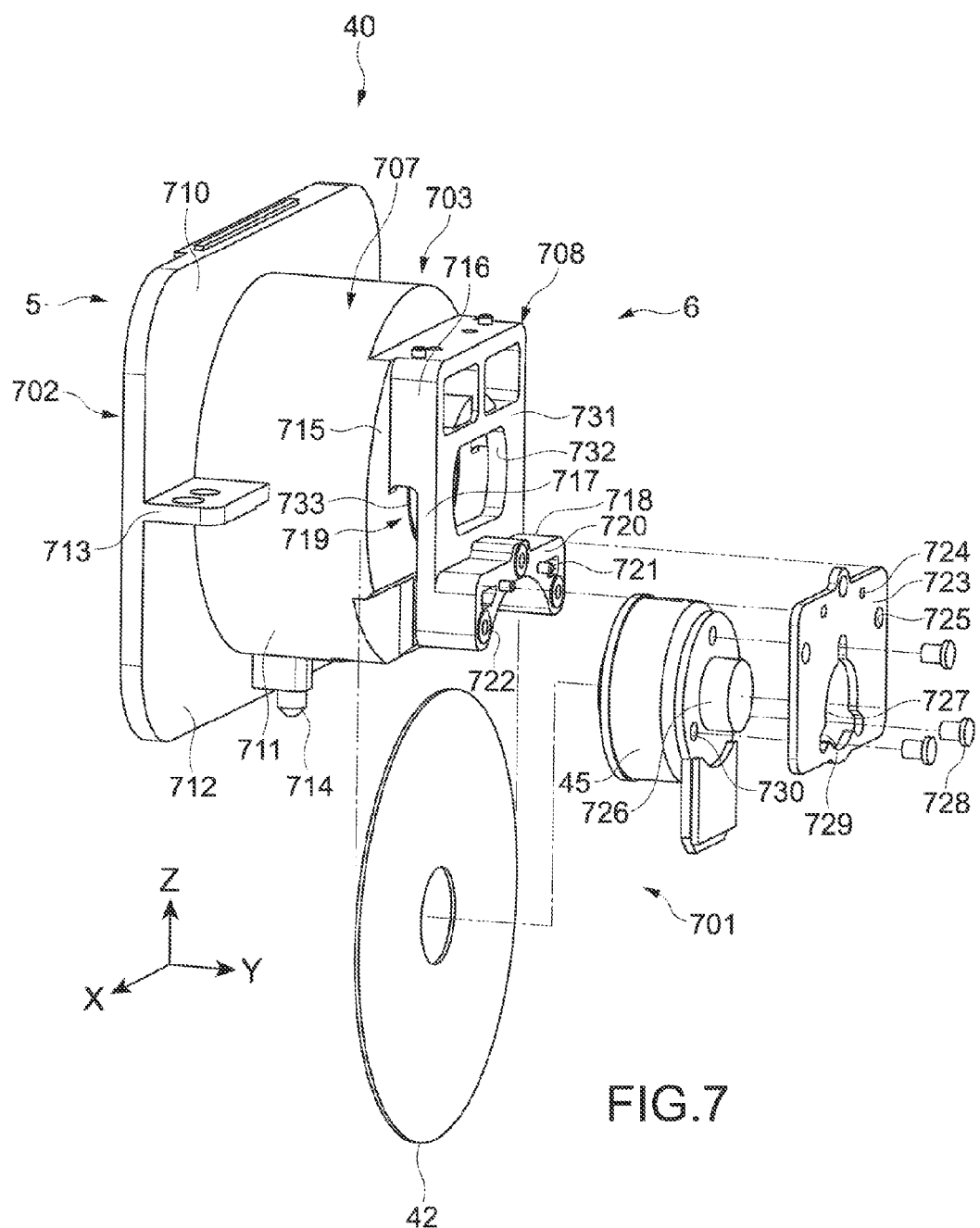
FIG. 7 is an exploded perspective view of the fluorescent body unit shown in FIG. 6.

FIG. 6 is a perspective view showing a structural example of the fluorescent body unit 40 of this embodiment. FIG. 7 is an exploded perspective view of the fluorescent body unit 40. The fluorescent body unit 40 of this embodiment will be described with reference to FIGS. 5 to 7. It should be noted that the fluorescent body unit 40 corresponds to an optical unit in this embodiment.

The fluorescent body unit 40 includes a wheel portion 701, a lens portion 702, and a holder portion 703 that supports the wheel portion 701 and the lens portion 702 as one unit. The wheel portion 701 includes a fluorescent body wheel 42 and a motor 45 that rotates the fluorescent body wheel 42. As shown in FIG. 5, the fluorescent body wheel 42 includes a disk-like substrate 43 through which the blue laser light B transmits, and a fluorescent body layer 41 is provided on an arrangement surface 44 of the substrate 43. The motor 45 is connected to a center of the substrate 43, and a rotation axis 46 thereof is set to coincide with a normal line passing the center of the substrate 43. Therefore, the fluorescent body wheel 42 is rotatable about the rotation axis 46 of the motor 45.

As shown in FIG. 5, the fluorescent body wheel 42 is arranged such that one of main surfaces 47 of the substrate 43 on a side on which the fluorescent body layer 41 is not provided faces the light collecting unit 33 side. Moreover, the fluorescent body wheel 42 is arranged such that a focal position of the blue laser light B collected by the light collecting unit 33 coincides with the predetermined point on the fluorescent body layer 41.

The fluorescent body layer 41 corresponds to a light emitter that is excited by light from the plurality of laser light sources 31 and emits visible light having a longer wavelength range than that light. In this embodiment, the fluorescent body layer 41 includes a fluorescent substance that emits fluorescent light by being excited by the blue laser light B having a center wavelength of about 445 nm. The fluorescent body layer 41 converts a part of the blue laser light B emitted from the plurality of laser light sources 31 into light having a wavelength range from a red wavelength range to a green wavelength range (i.e., yellow light) and emits the light.

As the fluorescent substance included in the fluorescent body layer 41, a YAG (yttrium aluminum garnet) fluorescent body is used, for example. It should be noted that the type of the fluorescent substance, the wavelength range of excitation light, and the wavelength range of the visible light generated by the excitation are not limited.

Furthermore, while absorbing a part of the excitation light, the fluorescent body 41 transmits a part of the excitation light so that it can also emit the blue laser light B emitted from the plurality of laser light sources 31. Accordingly, light emitted from the fluorescent body layer 41 becomes white light as a result of mixing blue excitation light and yellow fluorescent light. Since a part of the excitation light is transmitted as described above, the fluorescent body layer 41 may include filler particles as a particle substance having optical transparency, for example.

By the substrate 43 rotating by the motor 45, the laser light sources 31 irradiate the excitation light onto the fluorescent body layer 41 while relatively moving the irradiation position above the fluorescent body layer 41. As a result, by the fluorescent body unit 40, blue laser light B2 that has transmitted through the fluorescent body layer 41 and the white light including green light G2 and red light R2 as visible light from the fluorescent body layer 41 are synthesized and emitted as synthetic light. By the rotation of the fluorescent body wheel 42, it is possible to avoid deterioration due to the excitation light being irradiated onto the same position on the fluorescent body layer 41 for a long time.

The lens portion 702 includes at least one lens 704 that collects white light emitted from the wheel portion 701 and a light emitting surface 705 that emits the collected white light. As shown in FIGS. 1 to 3, the at least one lens 704 includes an emission lens 706 constituting the light emitting surface 705. Further, a plurality of lenses may be arranged on the rear side of the emission lens 706. For example, another lens that collects the white light emitted from the fluorescent body wheel 42 and guides the light to the emission lens 706 is arranged on the front side of the fluorescent body wheel 42. The number of lenses to be arranged as the at least one lens 704, the size thereof, the lens type, and the like are not limited.

As shown in FIGS. 3 and 6, in this embodiment, a center line M passing the center of the at least one lens 704 coincides with the optical axis A of white light emitted from the emission lens 706. In other words, white light is emitted from the emission lens 706 with an extension direction of the center line M of white light being the optical axis direction. It should be noted that the relationship between the center line M and the optical axis A is a typical example and is not necessarily limited thereto.

The holder portion 703 includes a lens holding portion 707 that holds the at least one lens 704 with the light emitting surface 705 as the front side (coincides with front side 5) and a wheel holding portion 708 that is coupled with the lens holding portion 707 on the rear side of the lens holding portion 707 (coincides with rear side 6) and holds the wheel portion 701. As shown in FIGS. 1 and 6, the lens holding portion 707 includes a front surface portion 710 including a circular opening 709 to which the emission lens 706 is attached and an accommodating portion 711 that accommodates the at least one lens 704 including the emission lens 706 inside. The accommodating portion 711 is cylindrical and extends toward the rear side while having almost the same cross-sectional shape as the opening 709 of the front surface portion 710 and is coupled to a back surface 712 of the front surface portion 710. On the back surface 712 of the front surface portion 710, a connecting portion 713 used for connecting with the base portion 1 is formed. The connecting portion 713 is formed at almost the center of the back surface 712 in the height direction (z-axis direction) at a position adjacent to the accommodating portion 711. Moreover, a protrusion 714 to be fit into the base portion 1 is formed below the accommodating portion 711.

The wheel holding portion 708 is provided on a back surface 715 of the accommodating portion 711 while being coupled to the back surface 715. In this embodiment, the wheel holding portion 708 includes a base portion 716 coupled to an upper side of the back surface 715 and an arm portion 717 extending from the base portion 716 in the vertical direction as shown in FIG. 7. The wheel holding portion 708 also includes a motor holding portion 718 that is formed at a tip end of the arm portion 717 and holds the motor 45. The base portion 716, the arm portion 717, and the motor holding portion 718 are symmetric with respect to a line extending from the center of the back surface 715 of the accommodating portion 711 (position that passes center line M) in the vertical direction (z-axis direction) when seen from the rear side. In other words, the base portion 716, the arm portion 717, and the motor holding portion 718 are provided such that centers thereof coincide with the line that passes the center and extends in the vertical direction.

The arm portion 717 is provided while a predetermined gap 719 is formed between the arm portion 717 and the back surface 715 of the accommodating portion 711. The motor holding portion 718 protrudes toward the rear side from the tip end of the arm portion 717. On an attaching surface 720 on the back surface side of the motor holding portion 718, two protrusions 721 and three attachment holes 722 are formed to be bilaterally symmetric. As shown in FIG. 7, a fixing portion 723 formed of sheet metal, for example, is attached to the attaching surface 720. On an upper side of the fixing portion 723, two positioning holes 724 and three penetrating holes 725 are formed. The two protrusions 721 of the attaching surface 720 are inserted into the two positioning holes 724. The three penetrating holes 725 are provided on top of the attachment holes 722 of the attaching surface 720, and fixing members (not shown) such as a screw are inserted into the holes. As a result, the fixing portion 723 is attached to the attaching surface 720.

Almost below the center of the fixing portion 723, an inserting hole 727 into which a center portion 726 formed on the back surface side of the motor 45 is inserted is formed. In a state where the center portion 726 of the motor is inserted into the inserting hole 727, fixing members 728 such as a screw are inserted into attachment holes 730 formed on the back surface side of the motor via a penetrating hole 729 formed on the fixing portion 723. With this structure, the motor 45 is fixed to the fixing portion 723. In this embodiment, the motor 45 is fixed to the fixing portion 723 by three fixing members 728.

The fluorescent body wheel 42 is rotatably attached to the front side of the motor 45. The fluorescent body wheel 42 is attached such that a rotation axis 46 of the motor 45 passes the center of the fluorescent body wheel 42. At this time, the fluorescent body wheel 42 is inserted into the gap 719 formed between the back surface 715 of the accommodating portion 711 and the arm portion 717. Therefore, the arm portion 717 is formed so as to sandwich the fluorescent body wheel 42 with the accommodating portion 711 in the state where the fluorescent body wheel 42 is held.

As shown in FIG. 6, an opening 732 is formed at substantially the center of the back surface 731 of the wheel holding portion 708. The opening 732 is formed at a position where the optical axis A of white light passes the inside of the opening 732. The predetermined point P of the fluorescent body layer 41 is positioned on the optical axis A while the fluorescent body wheel 42 is loaded. Therefore while the fluorescent body wheel 42 is loaded, the predetermined point P is set inside the opening 732. The blue laser light B collected by the light collecting optical system 34 is collected at the predetermined point P via the opening 732 of the wheel holding portion 708. As shown in FIG. 7, an opening 733 is also formed at substantially the center of the back surface 715 of the accommodating portion 711, and white light is emitted from the fluorescent body wheel 42 to the lens portion 702 via the opening 733.

Figure 8:
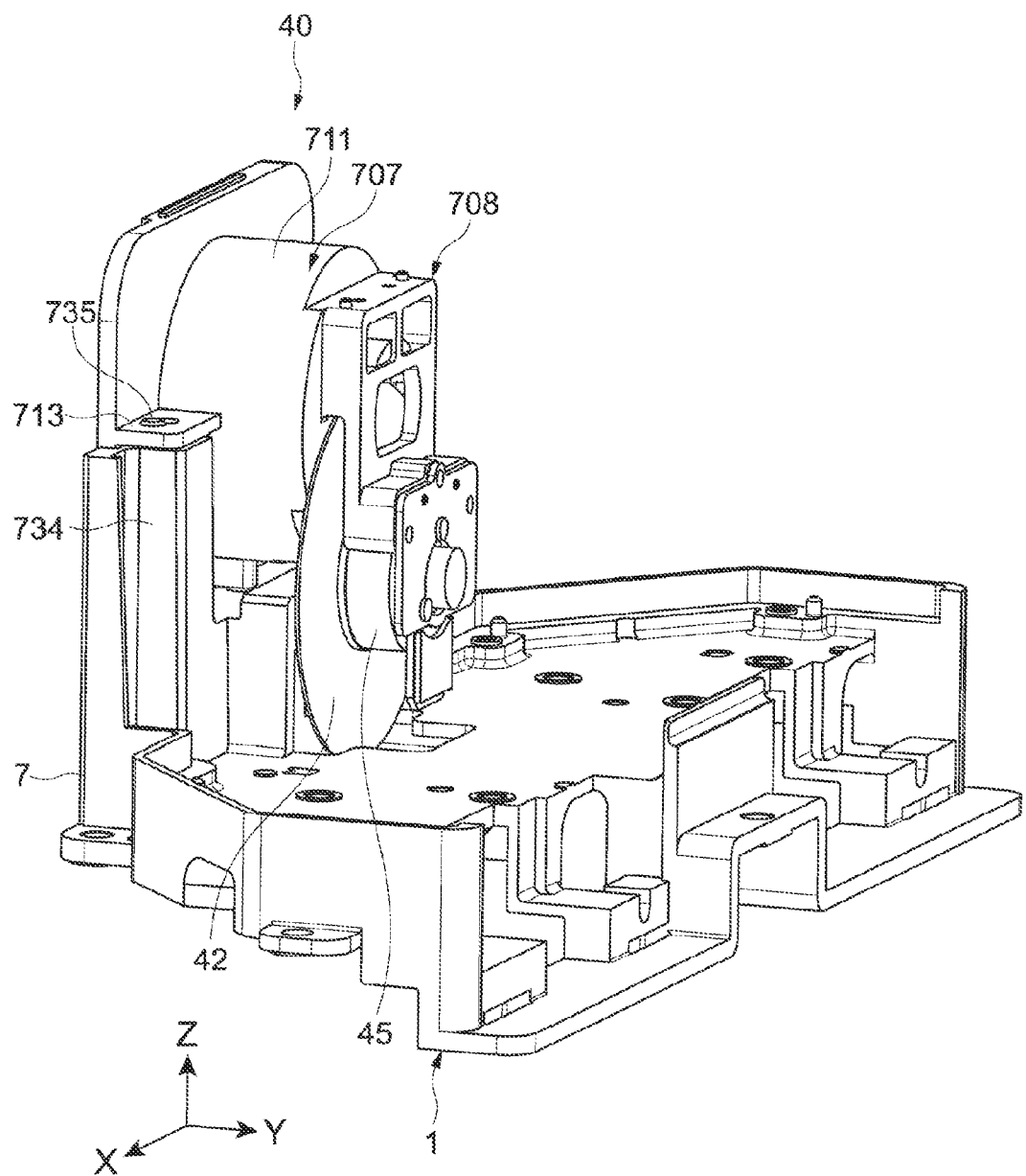
FIG. 8 is a diagram showing a state where the fluorescent body unit is attached to a base portion.

FIG. 8 is a diagram showing a state where the fluorescent body unit 40 is attached to the base portion 1. The connecting portion 713 formed in the lens holding portion 707 and a holding portion 734 formed in the first edge portion 7 of the base portion 1 are connected via a fixing member 735 such as a screw. At this time, the protrusion 714 below the accommodating portion 711 is fit into a concave portion of the base portion 1. As a result, the fluorescent body unit 40 is fixed to the base portion 1. As described above, in the fluorescent body unit 40 of this embodiment, the wheel portion 701 including the fluorescent body wheel 42 and the motor 45 and the lens portion 702 including the at least one lens 704 and the light emitting surface 705 are supported as one unit. Then, the unitized fluorescent body unit 40 is fixed to the base portion 1. Accordingly, the positioning of the lens for collecting light and the wheel including a light emitter can be realized simply and highly accurately.

For example, when assuming that a lens assembly corresponding to the lens portion 702 and a wheel assembly corresponding to the wheel portion 701 are fixed individually to the base portion 1 shown in FIG. 8, it becomes difficult to highly accurately realize positioning of the lens of the lens assembly and the fluorescent body wheel of the wheel assembly. For highly accurately positioning the lens assembly and the wheel assembly, the base portion 1 to which those members are attached needs to be structured with extremely-high accuracy. In other words, the structures of portions where the lens assembly and wheel assembly are attached and the positional relationship between them need to be highly accurate. Since other components such as the light source portions 30 and the light collecting unit 33 are also attached to the base portion 1, accuracy of the attachment portions is also required. Therefore, when the lens assembly and the wheel assembly are fixed individually, the number of portions that require accuracy increases, and thus a difficultly level of the components as the base portion 1 becomes high. As a result, a difficulty level for stabilizing the size of the base portion 1 also becomes high, and highly accurate positioning becomes difficult. In addition, the attachment itself becomes complex when the lens assembly and the wheel assembly are attached individually, and thus an assembling property of the entire light source apparatus becomes poor.

In this embodiment, the lens portion 702 and the wheel portion 701 are structured as one unit by the holder portion 703. In other words, the lens portion 702 and the wheel portion 701 are unitized (formed as an assembly). Then, the fluorescent body unit 40 is attached to the base portion 1. Accordingly, it becomes possible to accurately and simply determine the lens position and the fluorescent body wheel position inside the fluorescent body unit 40. It also becomes easy to accurately adjust the positional relationship between those members. Since the positioning accuracy only needs to be exhibited for the lens portion 702 and the wheel portion 701 inside the fluorescent body unit 40, it becomes possible to improve size stability and stabilize characteristics. Further, as compared to the case where the lens assembly and the wheel assembly are fixed individually, component costs can be suppressed. For example, since the difficulty level regarding the structure of the base portion 1 is suppressed, costs regarding the base portion 1 can be suppressed. Moreover, by the unitization, costs of the fluorescent body unit 40 itself can be suppressed.

Furthermore, the structure of the fluorescent body unit 40 can be simplified. For example, in this embodiment, the wheel portion 701 is held by the wheel holding portion 708 such that the rotation axis 46 of the motor 45 extends in the same direction as the optical axis A as shown in FIG. 6 and the like. Moreover, the wheel portion 701 is held by the wheel holding portion 708 such that the rotation axis 46 of the motor 45 is positioned below the center line M passing the center of the at least one lens 704 in the vertical direction. For example, by adopting such a structure, the fluorescent body unit 40 can be realized with a simple structure. It also becomes possible to arrange the fluorescent body wheel 42 close to the lens portion 702, and thus white light from the fluorescent body layer 41 can be efficiently guided to the lens portion 702. In addition, the fluorescent body unit 40 can be miniaturized.

As the miniaturization of the fluorescent body unit 40 is realized, it becomes possible to reduce an occupancy ratio of the fluorescent body unit 40 in the spatial portion 4 inside the casing portion 3 of the light source apparatus 100. As a result, a space for realizing the light collecting optical system 34 for collecting the fluorescent body layer 41 at the predetermined point P and the cooling structure for cooling the fluorescent body unit 40 and the like can be sufficiently secured. In other words, the light collecting optical system 34 can be realized while there are less restrictions to an optical path design, and thus the light collecting optical system 34 can be miniaturized. It also becomes possible to secure a cooling air flow path for cooling the fluorescent body wheel 42 or the motor 45. As a result, it becomes easy to realize the light collecting optical system 34, the cooling structure, and the like having advantageous effects in the light source apparatus 100 as will be described below.

As shown in FIG. 6, in this embodiment, the fluorescent body wheel 42 is sandwiched from both sides by the accommodating portion 711 and the arm portion 717. Accordingly, the attachment stability of the fluorescent body wheel 42 can be improved, and positioning with respect to the lens portion 702 can be performed highly accurately. Moreover, it is also possible to efficiently guide white light from the wheel portion 701 to the lens portion 702. Further, the center of the fluorescent body wheel 42 is held so as to be sandwiched by the accommodating portion 711 from an upper side. Therefore, in the light source apparatus 100, a large portion of the fluorescent body wheel 42 can be exposed, with the result that heat generated by the fluorescent body wheel 42 can be cooled efficiently by the cooling air and the like.

Since the fluorescent body unit 40 including the lens portion 702 and the wheel portion 701 is completed as one block, it can be versatilely used for different specifications. For example, by changing only a predetermined component out of the components such as the motor 45, the fluorescent body wheel 42, and the lens 704, the fluorescent body unit 40 having desired characteristics can be structured with ease.

Figure 9:
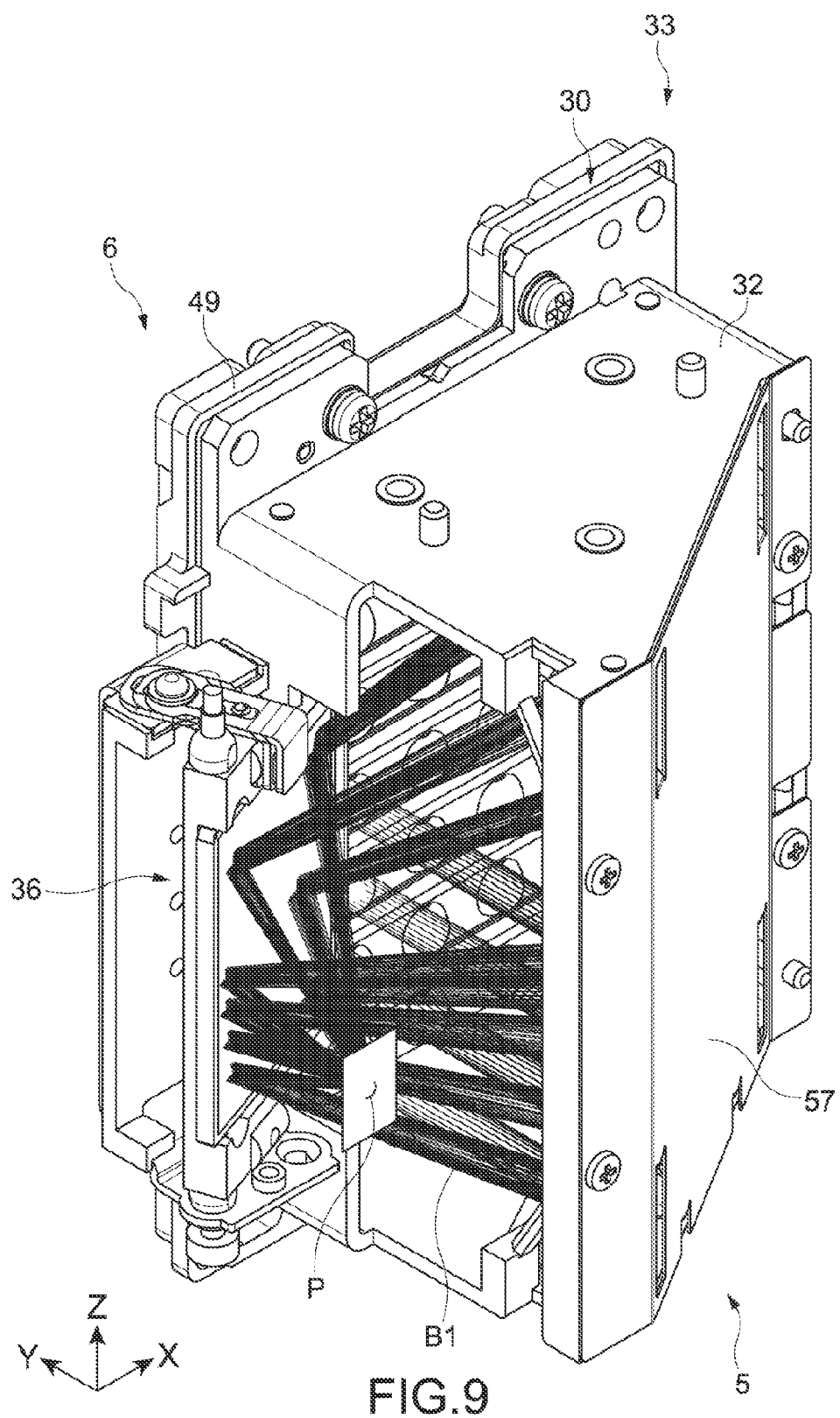
FIG. 9 is a perspective view showing a structural example of a light collecting unit.
Figure 10:
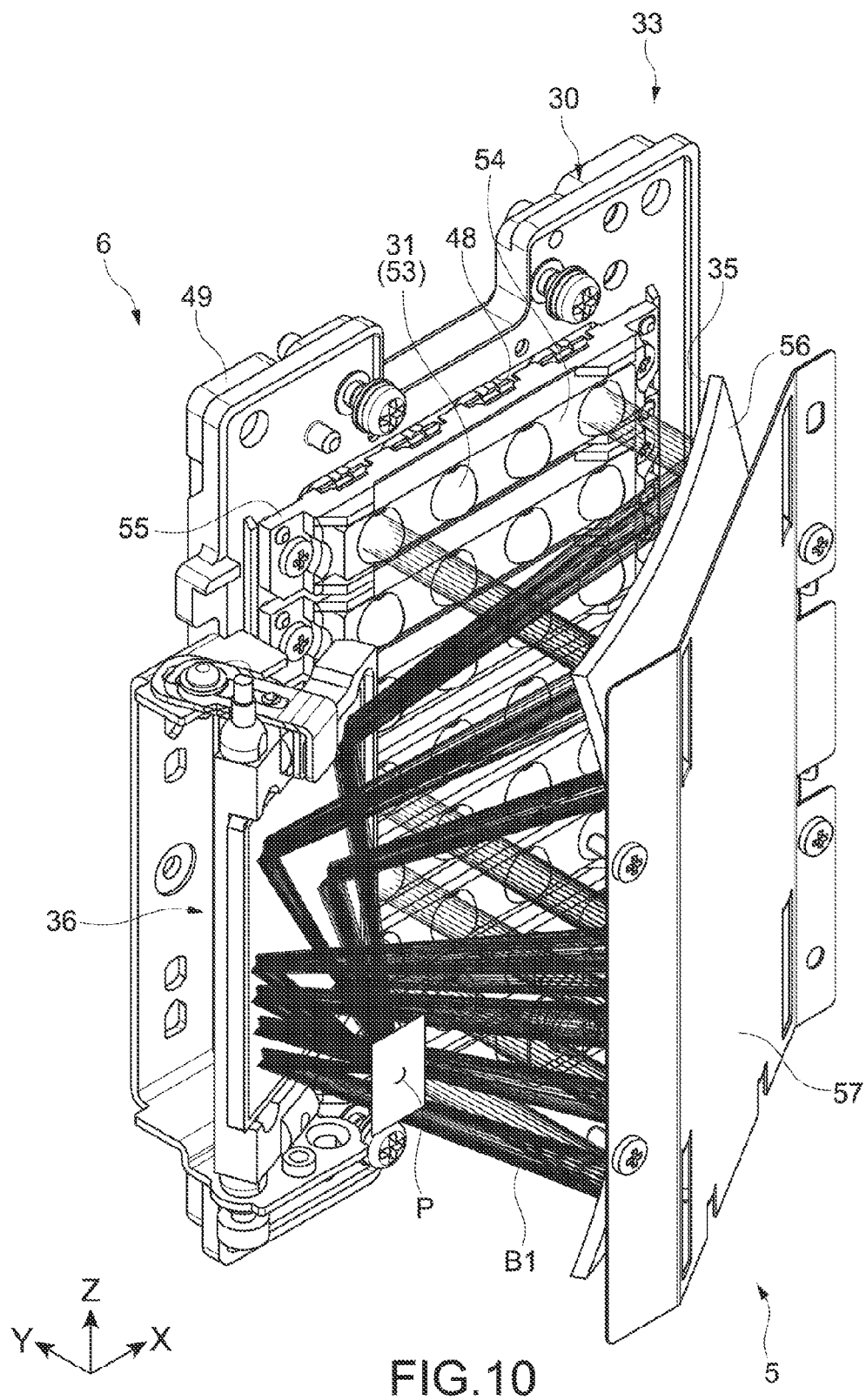
FIG. 10 is a perspective view showing a structural example of the light collecting unit.
Figure 11:
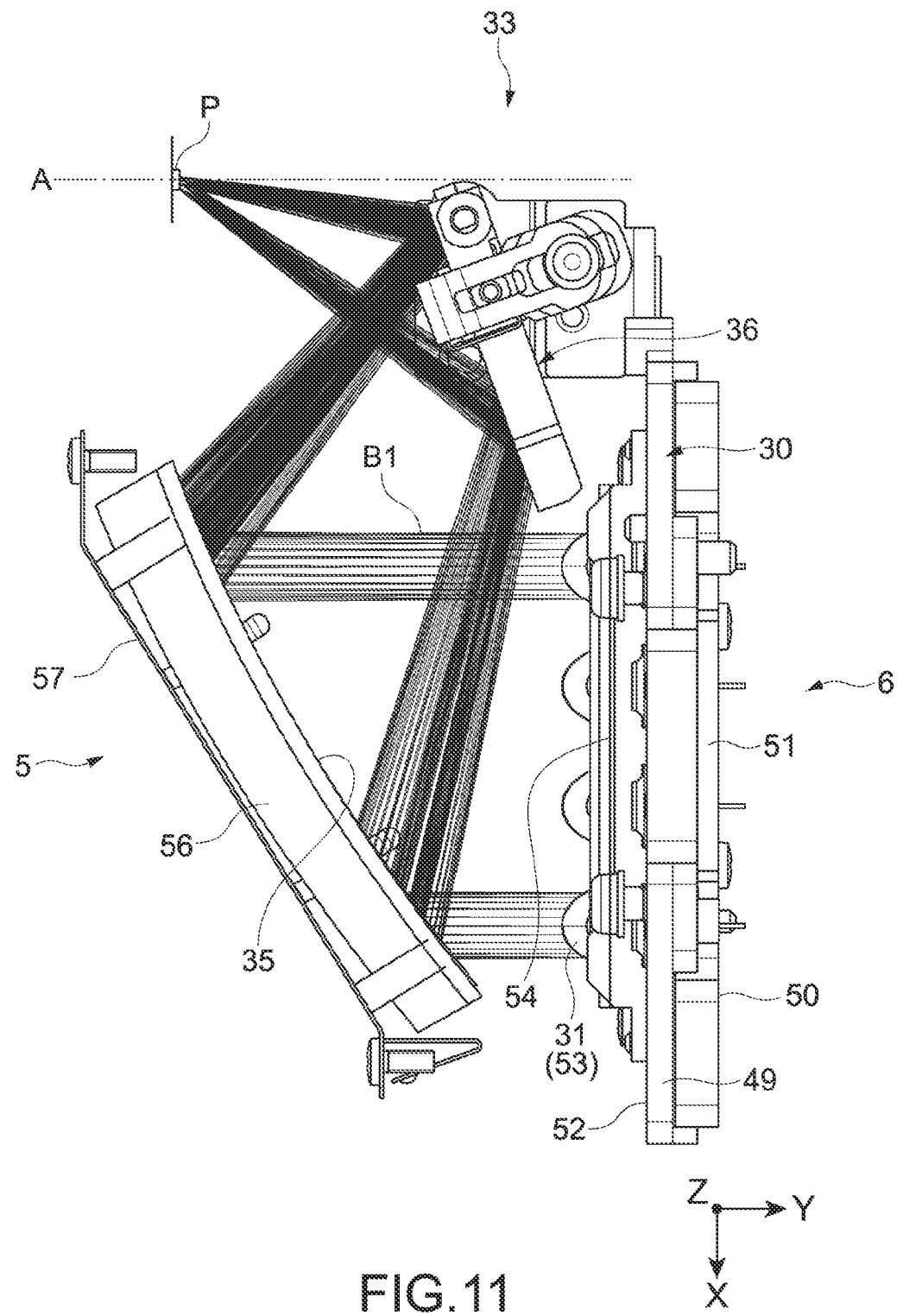
FIG. 11 is a plan view of the light collecting unit shown in FIG. 7 seen from the upper side.

FIGS. 9 and 10 are each a perspective view showing a structural example of the light collecting unit 33. In FIG. 10, an illustration of the supporting portion 32 is omitted. FIG. 11 is a plan view of the light collecting unit 33 shown in FIG. 10 seen from the upper side.

As described above, the light collecting unit 33 includes the light source portions 30, the non-spherical reflecting surface 35, the flat reflecting portion 36, and the supporting portion 32 that supports them as one unit. The shape and size of the supporting portion 32 are not limited as long as the supporting portion 32 can integrally support those components as one unit. Typically, the supporting portion 32 in a casing form is used so that the blue laser light B does not leak outside. Accordingly, usage efficiency of the blue laser light B is improved.

As shown in FIG. 10, in this embodiment, a laser light source array including 28 laser light sources 31 is used as the light source portion 30. The light source portion 30 includes a plate-like frame 49 in which an opening 48 is formed, and a mounting substrate 51 on which the plurality of laser light sources 31 are mounted is arranged on a back surface 50 of the frame 49 (surface on rear side 6). The plurality of laser light sources 31 emit the blue laser light B toward the front side 5 in the same direction as the optical axis A via the opening 48 of the frame 49. The laser light sources 31 are arranged such that 4 are arranged in the lateral direction of the light source apparatus 100 (x-axis direction) and 7 are arranged in the height direction (z-axis direction).

On a front surface 52 of the frame 49 (surface on front side 5), 28 collimator lenses 53 are arranged in correspondence with the plurality of laser light sources 31. The collimator lenses 53 are each a rotationally-symmetric non-spherical lens and convert the blue laser light B1 emitted from the laser light sources 31 into substantially-parallel light fluxes. In this embodiment, a lens unit 54 in which 4 linearly-arranged collimator lenses 53 are formed integrally is used, and 7 lens units 54 are arranged along the height direction. The lens units 54 are held by a holding member 55 fixed to the frame 49. It should be noted that in the figure, the collimator lenses 53 may be described as the laser light sources 31.

The structure of the light source portion 30 is not limited, and the frame 49 does not need to be used, for example. The number and arrangement of the laser light sources 31, the structure of the collimator lenses 53, and the like are also not limited. For example, it is also possible to not use the lens unit 54 and arrange the collimator lens for each of the laser light sources 31. Alternatively, light fluxes from the plurality of laser light sources 31 may collectively be converted into a substantially-parallel light flux by one collimator lens. It should be noted that in the figure, light fluxes of a part of the blue laser light B emitted from the plurality of laser light sources 31 (collimator lenses 53) are illustrated.

On the front side 5 of the plurality of laser light sources 31, a reflecting member 56 including the non-spherical reflecting surface 35 is arranged. The reflecting member 56 is arranged such that the non-spherical reflecting surface 35 opposes the plurality of laser light sources 31. The non-spherical reflecting surface 35 is arranged oblique to the plane direction of an arrangement surface 52 (xz plane direction) on which the plurality of laser light sources 31 are arranged. Accordingly, the blue laser light B is reflected toward the flat reflecting portion 36. A reflecting mirror is used as the reflecting member 56, for example.

The non-spherical reflecting surface 35 is typically a convex reflecting surface having a mirror surface, and the shape thereof is designed so that it can reflect and collect the blue laser light B from the plurality of laser light sources 31. Alternatively, the non-spherical reflecting surface 35 may be a rotationally-symmetric non-spherical surface or a free-form surface not including a rotational symmetry axis. The shape of the non-spherical reflecting surface 35 is set as appropriate based on the position of the plurality of laser light sources 31, the light reflecting direction, the light collecting position, the size and incident angle of the light flux of the blue laser light B that enters the non-spherical reflecting surface 35, and the like. The material of the reflecting member 56 is not limited, and a metal material or glass is used, for example.

The outer shape and size of the reflecting member 56 can be set as appropriate based on the size of the irradiation area of the blue laser light B1. For example, a reflecting member 56 having practically a rectangular shape may be used, or a triangular or other polygonal reflecting member 56 may be used. Accordingly, it becomes possible to appropriately adjust the outer shape of the reflecting member 56 and make it smaller than in the case where a light collecting lens is used for collecting light from the plurality of laser light sources 31. As a result, the light collecting optical system 34 can be made compact, and an enlargement of the light source apparatus 100 can be suppressed.

As shown in FIG. 11, the reflecting member 56 is supported by a supporting member 57. As shown in FIG. 9, the supporting member 57 is fixed to the supporting portion 32 by screwing. Accordingly, the reflecting member 56 is supported by the supporting portion 32.

Figure 12:
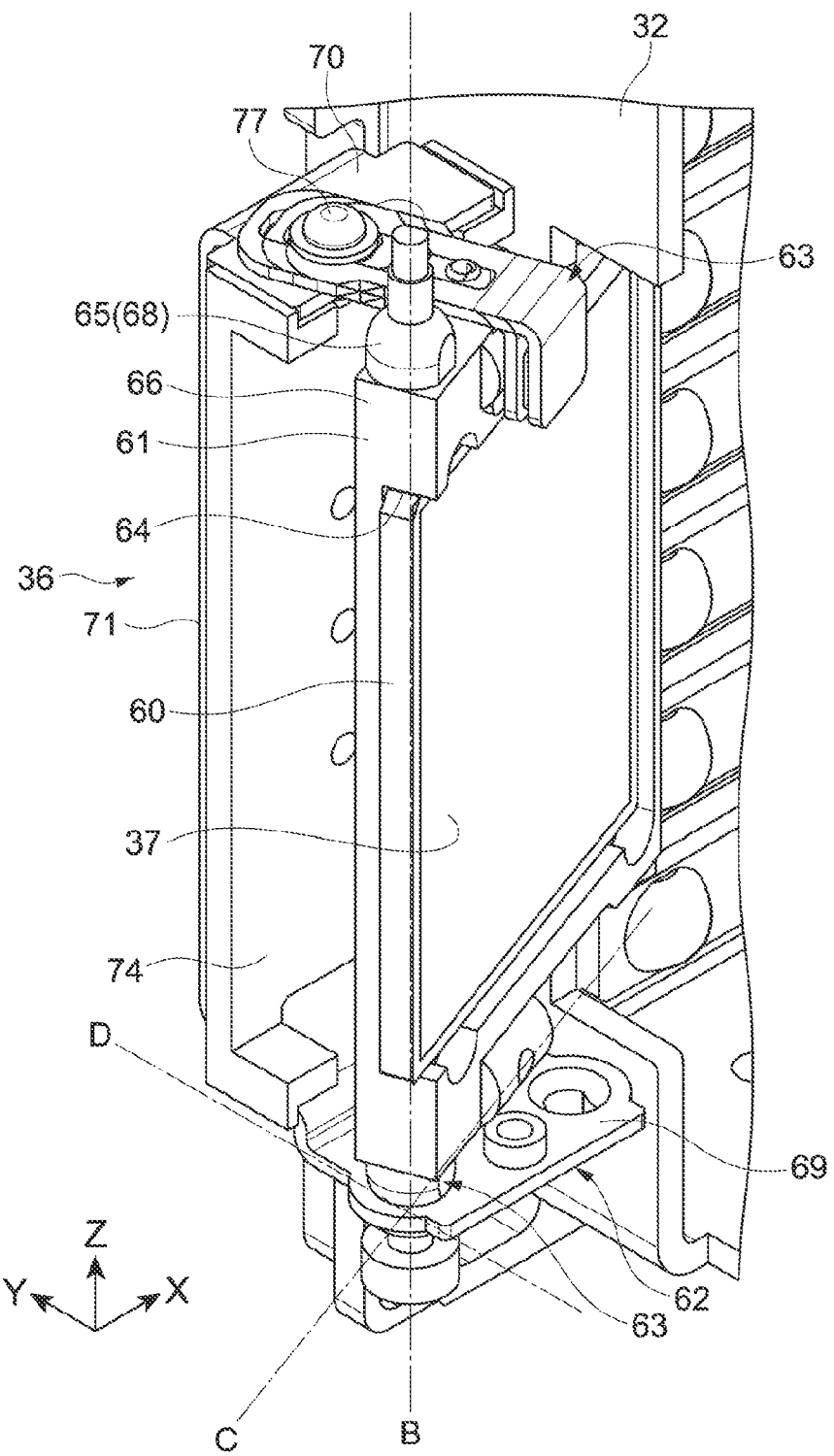
FIG. 12 is an enlarged diagram of a flat reflecting portion supported by a supporting portion.

FIG. 12 is an enlarged diagram of the flat reflecting portion 36 supported by the supporting portion 32. The flat reflecting portion 36 includes a flat reflecting member 60 including the flat reflecting surface 37. The flat reflecting surface 37 reflects the blue laser light B1 reflected by the non-spherical reflecting surface 35 to the predetermined point P on the fluorescent body layer 41. The flat reflecting surface 37 is typically a mirror surface. As the flat reflecting member 60, a reflecting mirror is used, for example. The material of the flat reflecting member 60 is not limited, and a metal material or glass is used, for example.

The flat reflecting portion 36 includes a member holding portion 61 that holds the flat reflecting member 60, a supporting frame 62 that rotatably and tiltably supports the lower portion of the member holding portion 61, and a coupling portion 63 that couples the member holding portion 61 and the supporting frame 62 on the upper side of the member holding portion 61.

As shown in FIG. 12, the member holding portion 61 has a plate shape, and a concave portion 64 is formed on almost the entire area of one surface. The plate-like flat reflecting member 60 is fit into the concave portion 64. The member holding portion 61 is erected in the height direction (z-axis direction). A normal line direction of the surface on which the concave portion 64 is formed, that is, the normal line direction of the flat reflecting surface 37 corresponds to the direction orthogonal to the z axis.

An axial portion 65 extending in the z-axis direction is formed at an end portion of the member holding portion 61. The axial portion 65 is integrally formed with the member holding portion 61, and the member holding portion 61 rotates as the axial portion 65 rotates, for example. Therefore, the flat reflecting member 60 held by the member holding portion 61 also moves integrally with the axial portion 65. In other words, the member holding portion 61 integrally holds the flat reflecting surface 37 with the axial portion 65.

As shown in FIG. 12, the axial portions 65 are formed so as to be arranged linearly in the longitudinal direction of the member holding portion 61. Attachment portions 66 are formed above and below the member holding portion 61, and the axial portions 65 are formed at the attachment portions 66. The attachment portions 66 formed above and below have the same shape, and the axial portions 65 also have the same shape.

One of the two axial portions 65 is inserted into an axis supporting hole 67 formed on the supporting frame 62. The other axial portion 65 is used as an operating portion 68 that is operated when adjusting an angle of the flat reflecting surface 37. The coupling portion 63 is attached to the attachment portion 66 on the operating portion 68 side. For example, the axial portion 65 to be inserted into the axis supporting hole 67 is selected as appropriate based on the arrangement position of the flat reflecting surface 37, the design of the light collecting unit 33, and the like.

In forming the member holding portion 61, the axial portions 65 having the same shape are formed above and below the member holding portion 61. Specifically, since the axial portion 65 and the operating portion 68 only need to be formed in the same shape without distinguishing one from the other, the production cost of the member holding portion 61 can be lowered. Moreover, since the axial portion 65 to be inserted into the axis supporting hole 67 can be selected, a degree of freedom regarding the attachment of the member holding portion 61 can be improved.

The supporting frame 62 includes a lower supporting portion 69, an upper supporting portion 70, and a coupling frame 71 for coupling those portions. The lower supporting portion 69 and the upper supporting portion 70 are arranged at substantially the same positions above and below the member holding portion 61 so as to oppose each other in the z-axis direction. The coupling frame 71 extends in the z-axis direction and couples the lower supporting portion 69 and the upper supporting portion 70.

The axis supporting hole 67 that supports the axial portion 65 of the member holding portion 61 is formed in the lower supporting portion 69. By the axial portion 65 being inserted into the axis supporting hole 67, the member holding portion 61 is supported rotatably and tiltably. For example, an oval hole having a short-axis direction and a long-axis direction is formed as the axis supporting hole 67. A circular inserting axis having a diameter that is substantially the same as the size of the axis supporting hole 67 in the short-axis direction is inserted into the oval axis supporting hole 67. The inserting axis is inserted so as to be rotatable with respect to the axis supporting hole 67 and tiltable in the long-axis direction. For example, with such a structure, a biaxial driving mechanism including a rotary driving system that uses the axial portion 65 (axis B) as the rotation axis and a rotary driving system (tilt driving system) that uses an axis C that is based on the axis supporting hole 67 as the rotation axis is realized. Accordingly, the angle of the flat reflecting surface 37 can be adjusted in the rotating direction and tilting direction of the axial portion 65.

It should be noted that the structure for rotatably and tiltably supporting the axial portions 65 is not limited to that described above, and an arbitrary structure may be adopted. In addition, materials of the supporting frame 62 including the lower supporting portion 69, the member holding portion 61 including the axial portions 65, and the like are also not limited, and metal or plastic may be used as appropriate, for example.

As shown in FIG. 12, the supporting frame 62 is supported by a frame supporting portion 74. The frame supporting portion 74 is included in the supporting portion 32 that supports the flat reflecting portion 36 and the like as one unit. In this embodiment, the supporting frame 62 is supported while being movable with respect to the frame supporting portion 74 in the front-back direction of the light source apparatus 100 (y-axis direction). As the supporting frame 62 moves in the y-axis direction, the member holding portion 61 and the supporting frame 62 move integrally. Accordingly, the position of the flat reflecting surface 37 is adjusted.

The structure of the moving mechanism for enabling the supporting frame 62 to move is not limited. For example, guide portions that guide the supporting frame 62 or the like are formed above and below the frame supporting portion 74. Moreover, the moving mechanism may be structured using, as appropriate, a spring member that exerts an elastic force in the moving direction, or the like. Alternatively, an arbitrary structure may be adopted. By the moving mechanism, a linear driving mechanism that uses an axis D as the driving axis is realized.

The adjustment of the position and angle of the flat reflecting surface 37 is carried out while a screw 77 is temporarily screwed. By rotating the operating portion 68, the angle of the flat reflecting surface 37 about the axial portion 65 is adjusted. Accordingly, the position of the light collecting point P can be adjusted in the lateral direction. Moreover, the tilt of the flat reflecting surface 37 can be adjusted by tilting the axial portion 65 by moving the operating portion 68 in the front-back direction. Accordingly, the position of the light collecting point P in the height direction can be adjusted. By adjusting the position of the supporting frame 62 in the front-back direction, a focus position of the light collecting point P can be adjusted. Upon ending the adjustment, the screw 77 is screwed so that the coupling portion 63 and the upper supporting portion 70 are fixed to the frame supporting portion 74.

In the light source apparatus 100 of this embodiment, two light collecting units 33 are arranged at two positions symmetric with respect to the axis A passing the fluorescent body layer 41. With such a structure, the number of laser light sources 31 is doubled to 56, and luminance of white light emitted from the fluorescent body layer 41 can be set high.

For example, when attempting to collect light from as much as 56 laser light sources 31 using the light collecting lens, an extremely large lens becomes necessary. In this embodiment, however, since the light collecting unit 33 that uses the non-spherical reflecting surface 35 is used, an enlargement of the light source apparatus can be suppressed. Therefore, high luminance can be obtained while suppressing the enlargement of the apparatus.

It should be noted that the blue laser light B from the two light collecting units 33 may be collected at one light collecting point P. On the other hand, light collecting points may be set at different positions on the fluorescent body layer 41. Accordingly, deterioration of the fluorescent body layer 41 can be suppressed.

In this embodiment, since the optical axis direction of white light W from the fluorescent body unit 40 is the same as the light emitting direction of the blue laser light B from the plurality of laser light sources 31, handling of the blue laser light B becomes easy. For example, a traveling direction of the blue laser light B1 can be grasped with ease in the case of assembling the light source apparatus 100 or adjusting the members. Therefore, it becomes possible to easily take safety measures for preventing sudden laser light irradiations and the like.

In this embodiment, the non-spherical reflecting surface 35 is used for collecting light with respect to the fluorescent body 41. Accordingly, the light source apparatus 100 can be made compact. For example, even when the number of laser light sources 31 is increased for obtaining high luminance, the size of the light collecting optical system 34 can be suppressed. As a result, high luminance can be achieved while suppressing the enlargement of the apparatus. Moreover, by using the non-spherical reflecting surface 35, a structure corresponding to the requisite luminance or shape can be realized with ease.

Further, in this embodiment, the flat reflecting member 60 that reflects the blue laser light B reflected by the non-spherical reflecting surface 35 toward the fluorescent body 41 is used. By providing such a reflecting member, the degree of freedom regarding the design of the light collecting optical system 34 can be improved. As a result, miniaturization of the light source apparatus 100, a desired shape of the apparatus, and the like can be realized.

Furthermore, in this embodiment, the plurality of laser light sources 31 and the light collecting optical system 34 are supported by the supporting portion 32 as one unit. Therefore, a plurality of unitized light collecting units 33 can be provided with ease, that is, it becomes possible to support in a multiunit. Since the shape and the like of the light collecting unit 33 can also be changed flexibly, the light collecting units 33 having various structures can be combined as appropriate to support various specifications.

(Cooling Structure)

Next, a cooling structure for cooling the fluorescent body unit 40 of the light source apparatus 100 having the structure as described above will be described. By the cooling structure according to the present disclosure, the fluorescent body wheel 42 and the motor 45 can be cooled efficiently.

Figure 13:
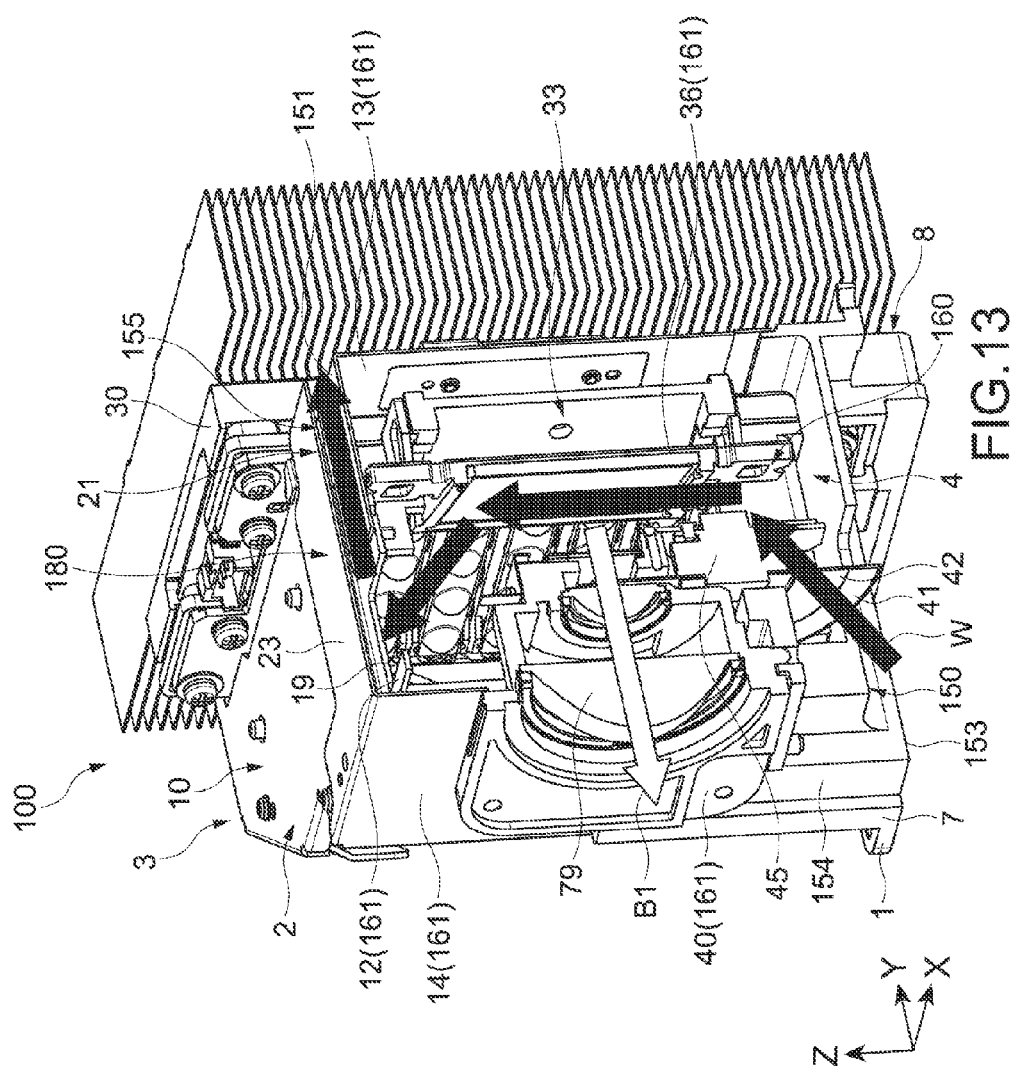
FIG. 13 is a cross-sectional diagram of the light source apparatus shown in FIG. 1 taken along the line C-C.
Figure 14:
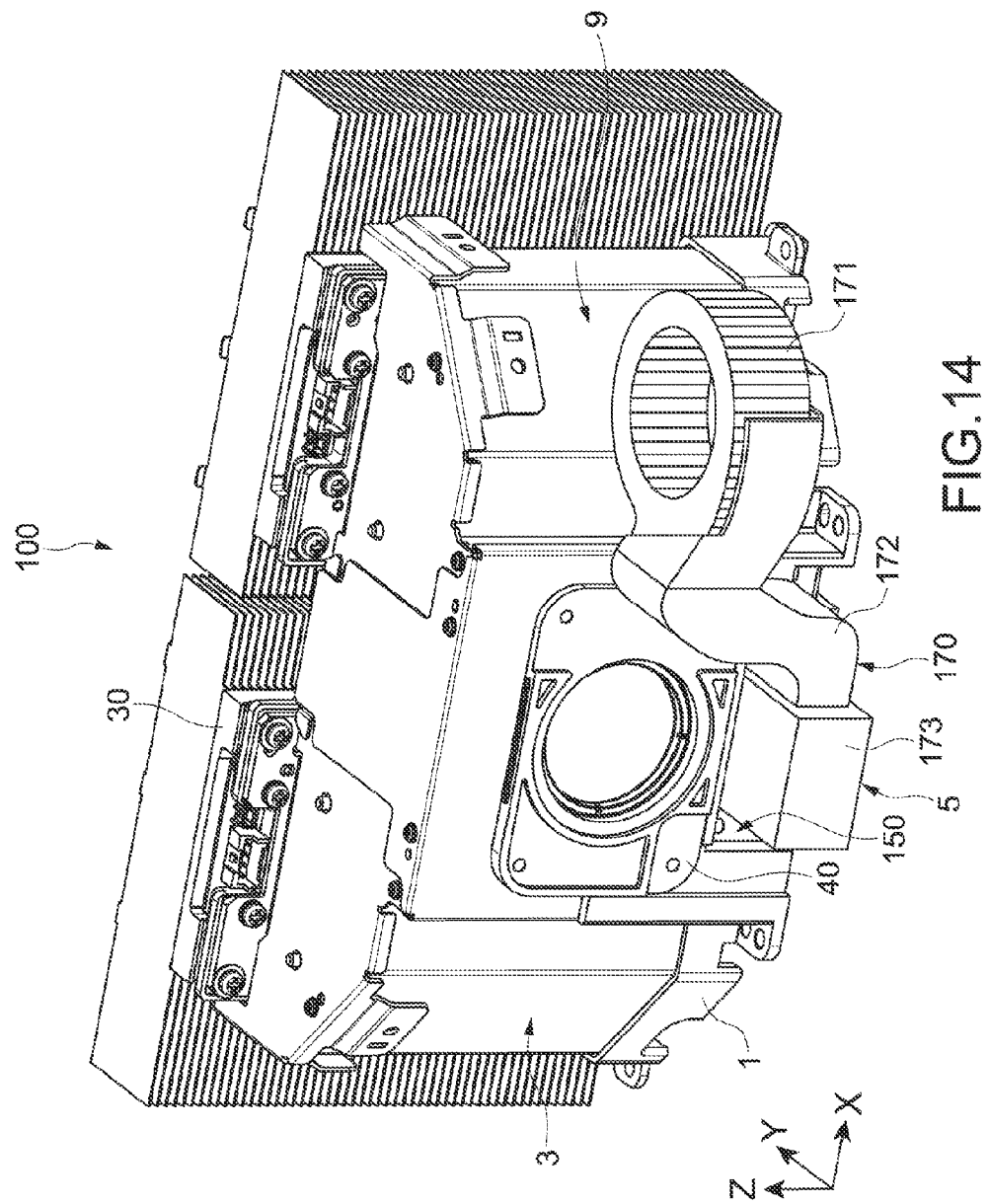
FIG. 14 is a diagram showing a structural example of a delivering unit for delivering cooling air for cooling the fluorescent body unit into a spatial portion inside a casing portion of the light source apparatus.

FIG. 13 is a cross-sectional diagram of the light source apparatus 100 shown in FIG. 1 taken along the line C-C. FIG. 14 is a diagram showing a structural example of a delivering unit 170 for delivering cooling air for cooling the fluorescent body unit 40 into the spatial portion 4 inside the casing portion 3 of the light source apparatus 100.

As shown in FIGS. 1 and 13, the casing portion 3 includes an inlet 150 for taking in cooling air and an outlet 151 for discharging the cooling air W. The inlet 150 and the outlet 151 are provided so as not to oppose the optical path of the blue laser light B from the light source portion 30 to the fluorescent body unit 40. The inlet 150 and the outlet 151 are formed at positions where the blue laser light B traveling through the optical path cannot be seen when looking at the spatial portion 4 of the casing portion 3 from the inlet 150 and the outlet 151, for example. This includes a state where an opening direction of the inlet 150 and the outlet 151 with respect to the spatial portion 4 does not oppose the optical axis and a state where, although the opening direction opposes the optical axis, it does not directly oppose the optical axis since other members are provided between the inlet 150 and the outlet 151 and the optical axis.

As described above, the fluorescent body unit 40 includes the fluorescent body wheel 42 that supports the fluorescent body layer 41, the motor 45 that rotates the fluorescent body wheel 42, and a light collecting lens 79 that collects white light. As shown in FIG. 13, the inlet 150 is formed at a position where the cooling air W taken in from the inlet 150 is delivered to the fluorescent body wheel 42 and the motor 45. Accordingly, the fluorescent body wheel 42 and the motor 45 can be cooled effectively. As a result, long-term reliability of the fluorescent body wheel 42 and motor 45 can be secured.

In this embodiment, the fluorescent body unit 40 is provided at the first edge portion 7 of the base portion 1. The inlet 150 is formed at the first edge portion 7 of the base portion 1 so as to oppose the fluorescent body unit 40. As shown in FIG. 13, as the inlet 150, an opening is formed at a portion of a bottom surface 153 and front surface 154 of the first edge portion 7 so as to oppose the fluorescent body wheel 42. The cooling air W is delivered from the front side of the fluorescent body wheel 42 in an upper oblique direction from the inlet 150. Since an air flow occurs due to a rotary centrifugal force of the fluorescent body wheel 42 in the vicinity thereof, an inflow of the cooling air W is smooth.

The outlet 151 is formed on the lid portion 10 side of the casing portion 3. In this embodiment, the two light source portions 30 are provided at the second edge portion 8 of the base portion 1. The outlet 151 is formed in the vicinity of the lid portion 10 on the second edge portion 8 side. The outlet 151 is formed at substantially the center of the lid portion 10 in the lateral direction at a position between the two light source portions 30. This position corresponds to a position on the rear side of the inlet 150 on the optical axis A shown in FIG. 3 (see FIG. 15).

By forming the outlet 151 between the two light source portions 30, the cooling air can be discharged smoothly. Air is delivered to a heat sink 90 on the rear side of the light source portions 30 by a fan or the like. A design for efficiently drawing out cooling air from the outlet using the flow of air from the fan also becomes possible.

As shown in FIG. 13, in an area where the rear member 13 and the front member 14 constituting the outer frame portion 2 overlap (overlap portion 21), a space 155 is formed between those members. A most-rearward opening portion of the overlap portion 21 is the outlet 151. Therefore, the cooling air W is discharged from the outlet 151 via the space 155 inside the overlap portion 21.

In the spatial portion 4 to be a flow path of the cooling air W, a bending portion 160 that bends the flow path of the cooling air traveling from the inlet 150 to the outlet 151 via the fluorescent body unit 40 is formed. The bending portion 160 is formed by appropriately arranging a bending member 161 in a traveling path of the cooling air W, for example. By bending the flow path of the cooling air W from the inlet 150 to the outlet 151 as described above, the leakage of the blue laser light B from the inlet 150 or the outlet 151 can be sufficiently suppressed. In other words, forming the bending portion 160 is effective for efficiently delivering the cooling air W traveling between the inlet 150 and the outlet 151 to a cooling target when the inlet 150 and the outlet 151 are formed at positions where the blue laser light B does not leak.

A member arranged in the spatial portion 4 of the casing portion 3 may be used as the bending member 161 for forming the bending portion 160. In other words, it is possible to use the members such as the light collecting unit 33 and the fluorescent body unit 40 as the bending member 161 as appropriate and design the arrangement positions thereof as appropriate so as to form the bending portion 160. In this embodiment, the flow path of the cooling air W is bent by the flat reflecting portion 36 of the light collecting unit 33. Moreover, the flow path of the cooling air W is bent by the rear member 13 and front member 14 constituting the outer frame portion 2, and the like. In other words, those members are used as the bending member 161. Accordingly, the number of components can be reduced, and the bending portion 160 can be structured easily.

As shown in FIG. 14, on the front side 5 of the light source apparatus 100, the delivering unit (delivering portion) 170 that delivers the cooling air W to the inlet 150 is attached. The delivering unit 170 includes a fan 171, a fan duct 172, and a delivering duct 173. The fan 171 has its rotation axis set along the height direction and rotates in the horizontal direction (xy plane direction). The fan 171 is set at substantially the center of the side wall portion 9 in the height direction. The fan duct 172 is connected to the fan 171 and bent downwardly toward the inlet 150 formed on the base portion 1. A tip end of the fan duct 172 is connected to the delivering duct 173. The delivering duct 173 is connected to the inlet 150 formed on the base portion 1 and delivers the cooling air W from the delivering duct 173 to the inlet 150. By delivering the cooling air W by the delivering unit 170 as described above, the fluorescent body wheel 42 and the motor 45 can be cooled sufficiently. It should be noted that the structure and arrangement position of the delivering unit 170 are not limited and may be set as appropriate.

Referring to FIG. 13, the flow of the cooling air W from the inlet 150 to the outlet 151 will be described. First, the fan 171 of the delivering unit 170 is rotated, and the cooling air W is delivered to the inlet 150 via the fan duct 172 and the delivering duct 173. Accordingly, the cooling air W is delivered from the front side of the fluorescent body wheel 42 in an upper oblique direction. A traveling path of the cooling air W blown against the fluorescent body wheel 42 and the motor 45 is bent by the flat reflecting portion 36 so that the cooling air W travels upwardly. At this time, the cooling air W travels along the rear side of the fluorescent body unit 40. Accordingly, the fluorescent body wheel 42 and the motor 45 are cooled sufficiently. The cooling air W travels upwardly from the opening 19 of the lid member 12 shown in FIG. 2. Then, the traveling path is bent by the upper surface portion 23 of the front member 14 provided so as to overlap the lid member 12, and thus the cooling air W travels to the rear side. Subsequently, using a gap between the upper surface portion 23 and the rear member 13 as the flow path, the cooling air W is discharged outside the casing portion 3 from the outlet 151.

Figure 15:
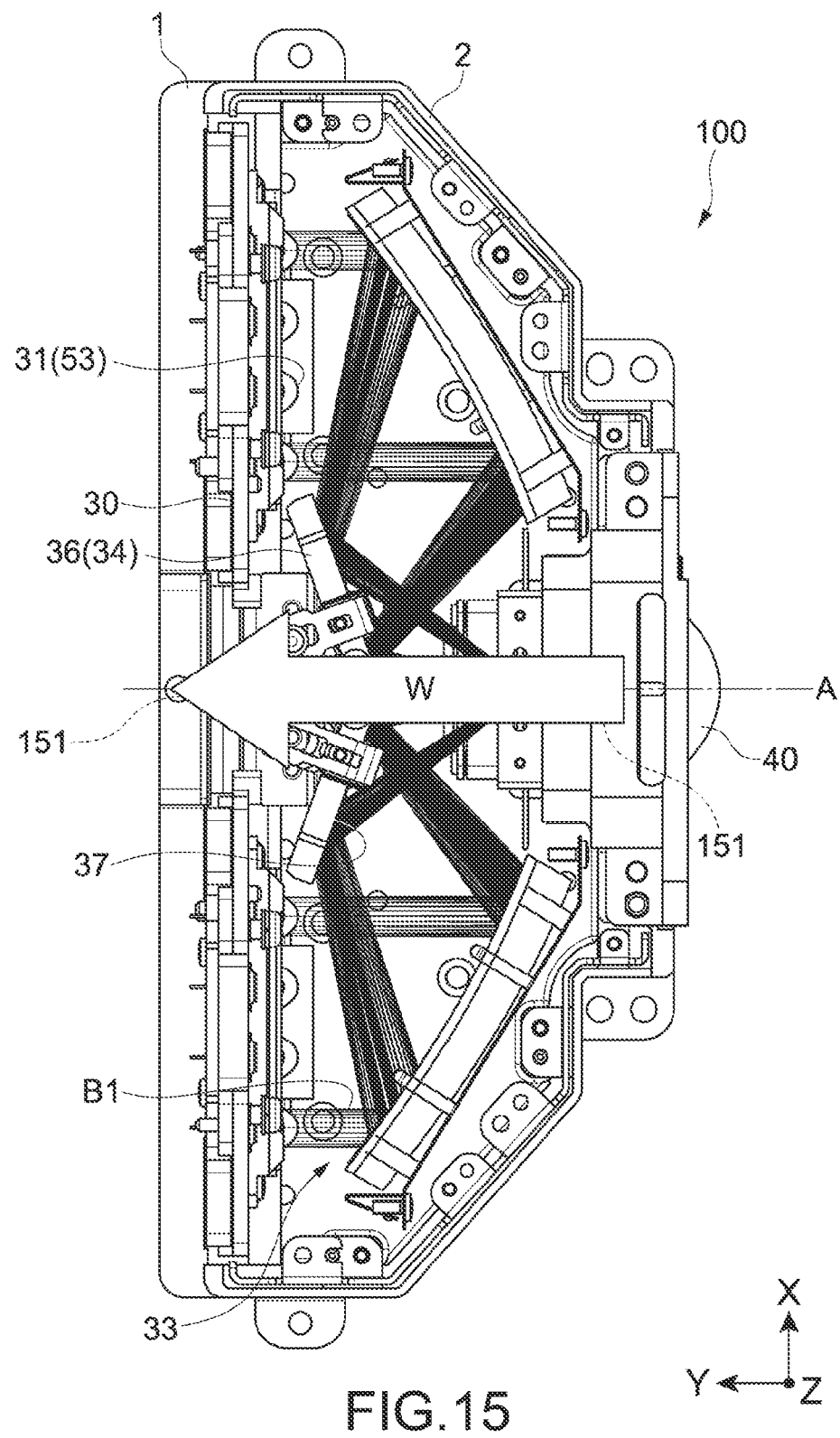
FIG. 15 is a diagram showing a cooling air flow path of the light source apparatus shown in FIG. 3 seen from the upper side.

As described above, in this embodiment, the cooling air W travels from the inlet 150 to the outlet 151 via the fluorescent body unit 40 in the direction orthogonal to the direction of the optical axis A. By setting the flow path of the cooling air W in the direction orthogonal to the optical axis direction, effective cooling becomes possible while sufficiently suppressing the leakage of the blue laser light B1. Moreover, as shown in FIG. 15, when the light source apparatus 100 is seen from the upper side, the cooling air W travels in a direction opposite to the optical path of the blue laser light B along the direction of the optical axis A. Such a structure is also effective in reducing the leakage of light. It should be noted that the present disclosure is not limited to the case where the flow path of the cooling air W is set in the direction orthogonal or opposite to the optical axis.

It should be noted that in this embodiment, the flow path subsequent to the opening 19 of the lid member 12 is structured as a light attenuating path 180 having a predetermined length toward the outlet 151. The light attenuating path 180 is a portion capable of sufficiently suppressing energy (intensity) of light even if emission light leaks from the outlet 151. As a basic structure, a path having a cross section that is almost of the same size as the outlet 151 is formed in a predetermined length toward the outlet 151. Even when light travels toward the outlet, reflection is repeated on an inner wall of the path, and optical energy is lowered.

In this embodiment, the light attenuating path 180 is structured by the opening 19 of the lid member 12, the upper surface portion 23 of the front member 14, and the rear member 13 positioned on the rear side of the opening 19 as shown in FIG. 13. Accordingly, even when the blue laser light B leaks from the outlet 151, energy thereof can be lowered, and an influence of the leaked light can be sufficiently suppressed. In this embodiment, the outer frame portion 2 is constituted of a plurality of frame members. By appropriately setting the size of the overlap portions 21, the arrangement positions of the members, and the like, the light attenuating path 180 can be formed with ease. It should be noted that the structure of the light attenuating path 180 is not limited, and the present disclosure is not limited to the case of structuring the light attenuating path 180 by a plurality of frame members.

In the light source apparatus 100 of this embodiment, the casing portion 3 that holds the light source portion 30 and the fluorescent body unit 40 includes the inlet 150, the outlet 151, and the spatial portion 4. By the cooling air W that travels from the inlet 150 to the outlet 151 using the spatial portion 4 as the flow path, the fluorescent body unit 40 including the fluorescent body layer 41 is cooled. The inlet 150 and the outlet 151 are formed so as not to oppose the blue laser light B from the light source portion 30 to the fluorescent body unit 40. Accordingly, effective cooling becomes possible while suppressing the leakage of the blue laser light B from the casing portion 3. Moreover, by structuring the outer frame portion 2 using a plurality of frame members, the cooling structure and light attenuating path 180 described above can be realized with ease.

Figure 16A:
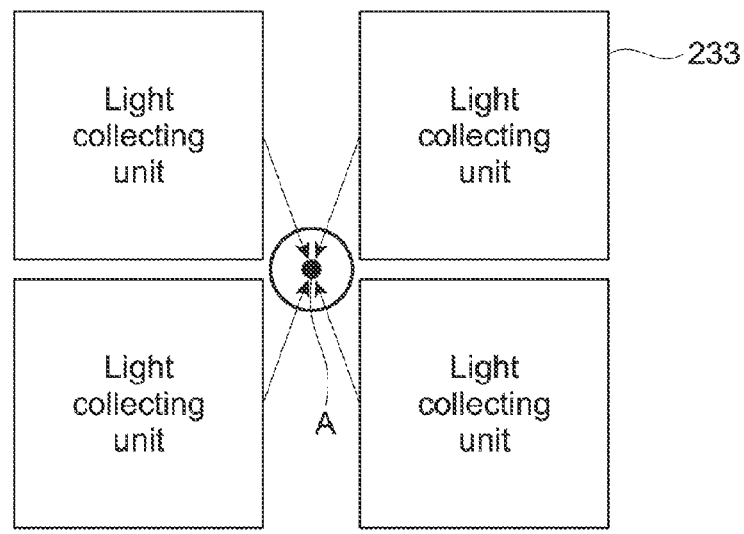
FIGS. 16A and 16B are schematic diagrams showing other structural examples in which a plurality of light collecting units are provided.
Figure 16B:
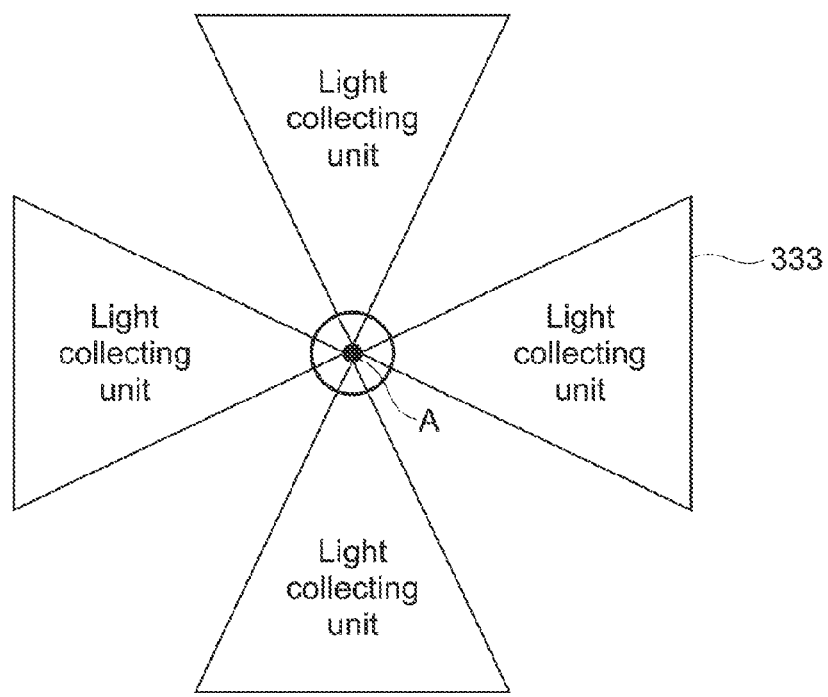

FIGS. 16A and 16B are schematic diagrams showing other structural examples in which a plurality of light collecting units are provided. For example, as shown in FIGS. 16A and 16B, 4 light collecting units 233 (333) may be arranged symmetrically with respect to the optical axis A. In each of the light collecting units 233 (333), an adjustment is made as appropriate so that light is collected at the light collecting point on the optical axis A. The number of light collecting units to be arranged is not limited, and a larger number of light collecting units may be arranged.

In FIG. 16A, a rectangular plane is used as the arrangement surface on which a plurality of laser light sources are arranged. The plane shape of the arrangement surface is a plane shape seen from the light emitting direction of the emission light from the plurality of laser light sources. For example, in the light source portion 30 shown in FIG. 10, the plane shape of the plate-like frame 49 corresponds to the plane shape of the arrangement surface. As shown in FIG. 16A, the outer shape of the light collecting units 233 seen from the light emitting direction is also rectangular in correspondence with the shape of the arrangement surface.

In FIG. 16B, a triangular plane is used as the arrangement surface on which a plurality of laser light sources are arranged. Therefore, the outer shape of the light collecting units 333 can also be formed in a triangle. Since a non-spherical reflecting surface is used as the light collecting optical system, the degree of freedom regarding the number of light sources, the arrangement thereof, and the like is high. This is because it is possible to design the shape and size of the non-spherical reflecting surface and the like as appropriate based on the light flux from the light source. As a result, a light source in which a plurality of light sources are arranged on the triangular arrangement surface as shown in FIG. 16A can be used. Thus, a light collecting unit whose outer shape is triangular when seen in the optical axis direction can be realized.

Since the shape of the light collecting unit can be set freely as described above, the shape of the light collecting unit can be easily set to be suited for a multiunit, and a plurality of light collecting units can be arranged in a limited space. As a result, the light source apparatus can be miniaturized.

Further, by arranging the plurality of light collecting units to be symmetrical with respect to the optical axis A, a degree of freedom can be given to the number of light collecting units or a combination of the light collecting units having various shapes. As a result, it becomes possible to support various specifications. It should be noted that the plane shape of the arrangement surface is not limited to a rectangle and a triangle, and a polygon, a circle, and the like may be used instead. The shape of the arrangement surface only needs to be set as appropriate based on the requisite shape of the light collecting unit.

(Image Display Apparatus)

Figure 17:
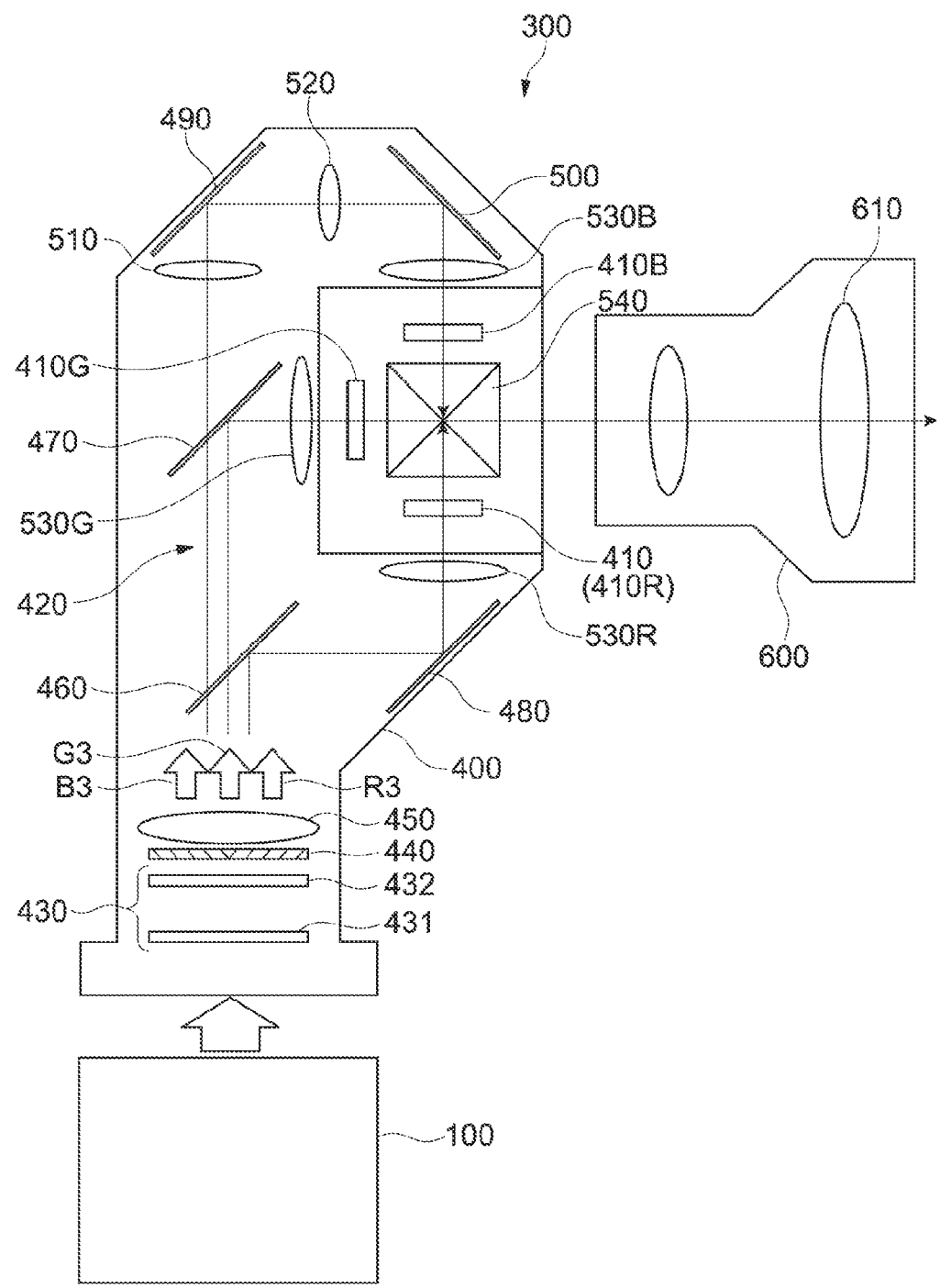
FIG. 17 is a schematic diagram showing a structural example of a projector as an image display apparatus according to the embodiment of the present disclosure.

An image display apparatus of this embodiment will be described. Here, a projector capable of mounting the light source apparatus described in the embodiment above will be taken as an example. FIG. 17 is a schematic diagram showing a structural example of the projector.

The projector 300 includes the light source apparatus 100 according to the present disclosure, an illumination system 400, and a projecting system 600. The illumination system 400 includes an image generating device 410 that generates an image based on irradiated light and an illumination optical system 420 that irradiates emission light from the light source apparatus 100 onto the image generating device 410. The projecting system 600 projects the image generated by the image generating device 410. The illumination system 400 functions as an image generating system in this embodiment.

As shown in FIG. 17, the illumination system 400 includes an integrator device 430, a polarization converting device 440, and a light collecting lens 450. The integrator device 430 includes a first fly-eye lens 431 including a plurality of micro-lenses arranged two-dimensionally and a second fly-eye lens 432 including a plurality of micro-lenses arranged so as to correspond one by one to the micro-lenses of the first fly-eye lens 431.

Parallel light that enters the integrator device 430 from the light source apparatus 100 is split into a plurality of light fluxes by the micro-lenses of the first fly-eye lens 431 and imaged on the corresponding micro-lenses of the second fly-eye lens 432. Each of the micro-lenses of the second fly-eye lens 432 functions as a secondary light source and irradiates the plurality of parallel light fluxes having aligned luminance onto the polarization converting device 440 as incident light.

As a whole, the integrator device 430 has a function of setting the incident light irradiated onto the polarization converting device 440 from the light source apparatus 100 to have a uniform luminance distribution.

The polarization converting device 440 has a function of aligning a polarization state of the incident light that enters via the integrator device 430 and the like. The polarization converting device 440 emits emission light including blue light B3, green light G3, and red light R3 via the light collecting lens 450 arranged on the light emitting side of the light source apparatus 100, for example.

The illumination optical system 420 includes dichroic mirrors 460 and 470, mirrors 480, 490, and 500, relay lenses 510 and 520, field lenses 530R, 530G, and 530B, liquid crystal light bulbs 410R, 410G, and 410B as the image generating devices, and a dichroic prism 540.

The dichroic mirrors 460 and 470 have a property of selectively reflecting color light of a predetermined wavelength range and transmitting light having other wavelength ranges. Referring to FIG. 17, for example, the dichroic mirror 460 selectively reflects the red light R3. The dichroic mirror 470 selectively reflects the green light G3 out of the green light G3 and blue light B3 that have transmitted the dichroic mirror 460. The remaining blue light 3 is transmitted through the dichroic mirror 470. Accordingly, light emitted from the light source apparatus 100 is split into a plurality of color light of different colors.

The split red light R3 is reflected by the mirror 480, passes through the field lens 530R to be converted into parallel light, and enters the liquid crystal light bulb 410R for a red light modulation after that. The green light G3 passes through the field lens 530G to be converted into parallel light and enters the liquid crystal light bulb 410G for a green light modulation after that. The blue light B3 passes through the relay lens 510, is reflected by the mirror 490, and is additionally reflected by the mirror 500 after passing through the relay lens 520. The blue light B3 reflected by the mirror 500 passes through the field lens 530B to be converted into parallel light and enters the liquid crystal light bulb 410B for a blue light modulation after that.

The liquid crystal light bulbs 410R, 410G, and 410B are electrically connected to a signal source (e.g., PC) (not shown) that supplies image signals including image information. The liquid crystal light bulbs 410R, 410G, and 410B each modulate incident light for each pixel based on the supplied image signals of the respective colors to generate a red image, a green image, and a blue image. The modulated light of the respective colors (formed images) enter the dichroic prism 540 to be synthesized. The dichroic prism 540 synthesizes the light of the respective colors that have entered from three directions by superimposing them and emits the synthesized light toward the projecting system 600.

The projecting system 600 includes a plurality of lenses 610 and irradiates the light synthesized by the dichroic prism 540 onto a screen (not shown). Accordingly, a full-color image is displayed.

By the light source apparatus 100 according to the present disclosure, the projector 300 can be miniaturized. By setting the shape of the light source apparatus 100 or the like as appropriate, a design property regarding the outer shape of the projector 300 can be improved, for example.

<Other Embodiments>

The present disclosure is not limited to the embodiment above, and various other embodiments can also be realized.

In the projector 300 shown in FIG. 17, the illumination system 400 structured using a transmission-type liquid crystal panel is shown. However, it is also possible to structure the illumination system using a reflection-type liquid crystal panel. A digital micro-mirror device (DMD) or the like may be used as the image generating device. Furthermore, a polarization beam splitter (PBS), a color synthesizing prism that synthesizes video signals of RGB colors, a TIR (Total Internal Reflection) prism, or the like may be used in place of the dichroic prism 540.

In the descriptions above, apparatuses other than the projector may be structured as the image display apparatus according to the present disclosure. In addition, the light source apparatus according to the present disclosure may be used for an apparatus that is not the image display apparatus.

At least two feature portions of the embodiments described above can be combined.

It should be noted that the present disclosure may also take the following structures.

(1) An optical unit, including:

a wheel portion including a wheel in which a light emitter that is excited by light of a predetermined wavelength range and emits visible light having a longer wavelength range than the light of the predetermined wavelength range is provided and a motor that drives the wheel, the wheel portion being configured to emit synthetic light including the light of the predetermined wavelength range and the visible light from the light emitter;

a lens portion including at least one lens that collects the synthetic light emitted from the wheel portion and a light emitting surface that emits the collected synthetic light; and a holder portion configured to support the wheel portion and the lens portion as one unit.

(2) The optical unit according to (1) above, in which the holder portion includes a lens holding portion that holds the at least one lens with the light emitting surface as a front side and a wheel holding portion that is coupled with the lens holding portion on a rear side of the lens holding portion and holds the wheel portion.

(3) The optical unit according to (2) above, in which the lens portion emits the synthetic light along a predetermined optical axis direction, and in which the wheel holding portion holds the wheel portion such that a rotation axis of the motor extends in the same direction as the predetermined optical axis direction.

(4) The optical unit according to (3) above,
in which the rotation axis of the motor is provided at a center of the wheel, and
in which the wheel holding portion holds the wheel portion such that the rotation axis of the motor is positioned below a center line passing a center of the at least one lens in a vertical direction.

(5) The optical unit according to any one of (2) to (4) above,
in which the wheel holding portion includes an arm portion formed on the rear side of the lens holding portion while sandwiching the wheel with the lens holding portion and a motor holding portion that is formed at a tip end of the arm portion and holds the motor.

It should be understood by those skilled in the art that various modifications, combinations, sub-combinations and alterations may occur depending on design requirements and other factors insofar as they are within the scope of the appended claims or the equivalents thereof.

What is claimed is:

1. An optical unit, comprising:
a wheel portion including a wheel in which a light emitter that is excited by light of a predetermined wavelength range and emits visible light having a longer wavelength range than the light of the predetermined wavelength range is provided and a motor that drives the wheel, the wheel portion being configured to emit synthetic light including the light of the predetermined wavelength range and the visible light from the light emitter;
a lens portion including at least one lens that collects the synthetic light emitted from the wheel portion and a light emitting surface that emits the collected synthetic light; and
a holder portion configured to support the wheel portion and the lens portion as one unit, wherein the holder portion includes a lens holding portion that holds the at least one lens with the light emitting surface as a front side and a wheel holding portion that is coupled with the lens holding portion on a rear side of the lens holding portion and holds the wheel portion.

2. The optical unit according to claim 1,
wherein the lens portion emits the synthetic light along a predetermined optical axis direction, and
wherein the wheel holding portion holds the wheel portion such that a rotation axis of the motor extends in the same direction as the predetermined optical axis direction.

3. The optical unit according to claim 2,
wherein the rotation axis of the motor is provided at a center of the wheel, and
wherein the wheel holding portion holds the wheel portion such that the rotation axis of the motor is positioned below a center line passing a center of the at least one lens in a vertical direction.

4. The optical unit according to claim 1,
wherein the wheel holding portion includes an arm portion formed on the rear side of the lens holding portion while sandwiching the wheel with the lens holding portion and a motor holding portion that is formed at a tip end of the arm portion and holds the motor.

5. A light source apparatus, comprising:
a light source portion including at least one solid light source capable of emitting light of a predetermined wavelength range as emission light;
an optical unit including
a wheel portion including a wheel in which a light emitter that is excited by the emission light from the light source portion and emits visible light having a longer wavelength range than the light of the predetermined wavelength range is provided and a motor that drives the wheel, the wheel portion emitting synthetic light including the light of the predetermined wavelength range and the visible light from the light emitter,
a lens portion including at least one lens that collects the synthetic light emitted from the wheel portion and a light emitting surface that emits the collected synthetic light, and
a holder portion that supports the wheel portion and the lens portion as one unit, wherein the holder portion includes a lens holding portion that holds the at least one lens with the light emitting surface as a front side and a wheel holding portion that is coupled with the lens holding portion on a rear side of the lens holding portion and holds the wheel portion; and
a base portion configured to support the light source portion and the optical unit.

6. The light source apparatus according to claim 5,
wherein the lens portion emits the synthetic light along a predetermined optical axis direction, and
wherein the wheel holding portion holds the wheel portion such that a rotation axis of the motor extends in the same direction as the predetermined optical axis direction.

7. The light source apparatus according to claim 6,
wherein the rotation axis of the motor is provided at a center of the wheel, and
wherein the wheel holding portion holds the wheel portion such that the rotation axis of the motor is positioned below a center line passing a center of the at least one lens in a vertical direction.

8. The light source apparatus according to claim 5,
wherein the wheel holding portion includes an arm portion formed on the rear side of the lens holding portion while sandwiching the wheel with the lens holding portion and a motor holding portion that is formed at a tip end of the arm portion and holds the motor.

9. An image display apparatus, comprising:
a light source portion including at least one solid light source capable of emitting light of a predetermined wavelength range as emission light;
an optical unit including
a wheel portion including a wheel in which a light emitter that is excited by the emission light from the light source portion and emits visible light having a longer wavelength range than the light of the predetermined wavelength range is provided and a motor that drives the wheel, the wheel portion emitting synthetic light including the light of the predetermined wavelength range and the visible light from the light emitter,
a lens portion including at least one lens that collects the synthetic light emitted from the wheel portion and a light emitting surface that emits the collected synthetic light, and
a holder portion that supports the wheel portion and the lens portion as one unit, wherein the holder portion includes a lens holding portion that holds the at least one lens with the light emitting surface as a front side and a wheel holding portion that is coupled with the lens holding portion on a rear side of the lens holding portion and holds the wheel portion;
a base portion configured to support the light source portion and the optical unit;

an image generating system including an image generating device that generates an image based on irradiated light and an illumination optical system that irradiates the synthetic light from the optical unit onto the image generating device; and
a projecting system configured to project the image generated by the image generating device.

10. The image display apparatus according to claim 9,
wherein the lens portion emits the synthetic light along a predetermined optical axis direction, and
wherein the wheel holding portion holds the wheel portion such that a rotation axis of the motor extends in the same direction as the predetermined optical axis direction.

11. The image display apparatus according to claim 10,
wherein the rotation axis of the motor is provided at a center of the wheel, and
wherein the wheel holding portion holds the wheel portion such that the rotation axis of the motor is positioned below a center line passing a center of the at least one lens in a vertical direction.

12. The image display apparatus according to claim 9,
wherein the wheel holding portion includes an arm portion formed on the rear side of the lens holding portion while sandwiching the wheel with the lens holding portion and a motor holding portion that is formed at a tip end of the arm portion and holds the motor.

* * * * *